United States Patent
Govindarajan et al.

(10) Patent No.: US 6,208,659 B1
(45) Date of Patent: *Mar. 27, 2001

(54) DATA PROCESSING SYSTEM AND METHOD FOR PROVIDING PERSONAL INFORMATION IN A COMMUNICATION NETWORK

(75) Inventors: Rangaprasad Govindarajan; Russ Edwards, both of Dallas, TX (US); Cecil Bannister, Colorado Springs, CO (US); Raffi Gostanian, Jr., McKinney, TX (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,639

(22) Filed: Dec. 22, 1997

(51) Int. Cl.[7] ............................................. H04L 12/28
(52) U.S. Cl. ........................................... 370/410; 370/400
(58) Field of Search ....................... 370/410, 400, 370/420, 426; 395/680, 683; 345/326, 333, 334, 335, 348, 349

(56) References Cited

U.S. PATENT DOCUMENTS

| | | | | |
|---|---|---|---|---|
| 5,634,129 | * | 5/1997 | Dickinson | 395/683 |
| 5,638,504 | * | 6/1997 | Scott | 345/348 |
| 5,706,517 | * | 1/1998 | Dickinson | 395/683 |
| 5,732,229 | * | 3/1998 | Dickinson | 345/334 |
| 5,793,365 | * | 8/1998 | Tang | 345/329 |
| 5,943,399 | * | 8/1999 | Bannister | 455/414 |
| 6,018,338 | * | 1/2000 | Greulich | 345/333 |

* cited by examiner

Primary Examiner—Douglas Olms
Assistant Examiner—Ricardo M. Pizarro
(74) Attorney, Agent, or Firm—Carr & Storm, L.L.P.

(57) ABSTRACT

A data processing system and methodology allow subscribers to have web business cards that are accessible by other individuals via communication networks such as the Internet. The data processing system serves as an enhanced paper business card by providing references to available communication devices that may be used to access an individual. The web cards also perform an active feedback operation to provide information about the roles played by and the status of the subscriber's communication devices. Additionally, information about the availability of the communication devices utilized to access the owner of the web card page may also be indicated to another individual.

39 Claims, 23 Drawing Sheets

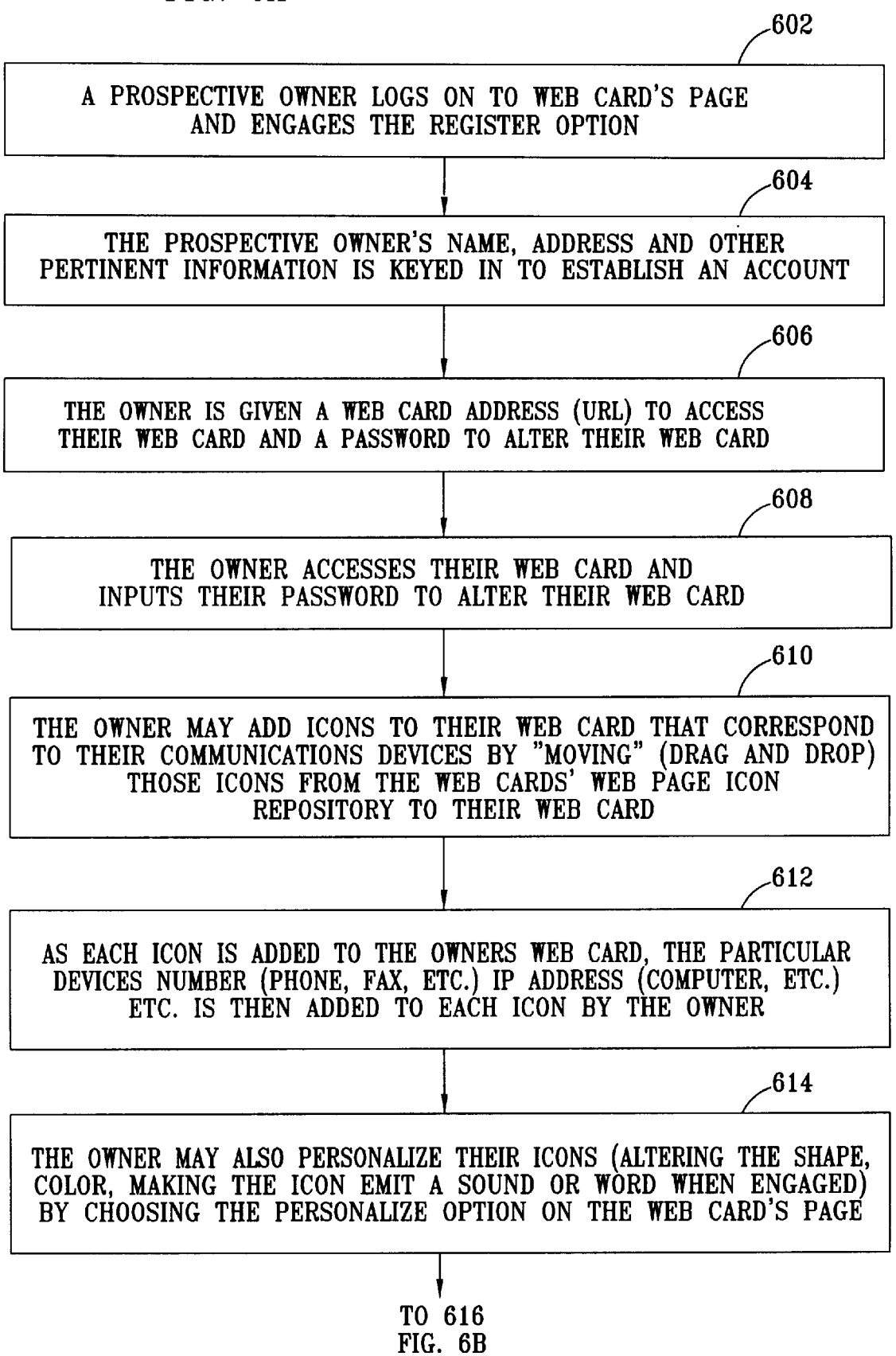

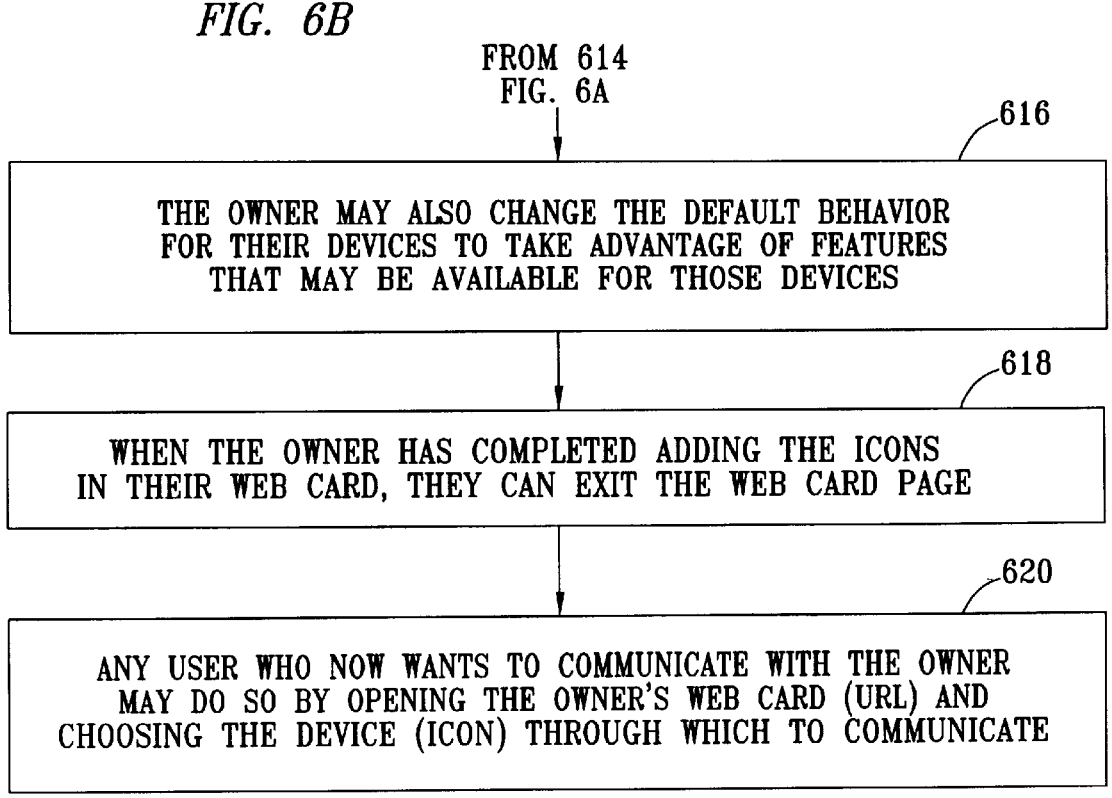
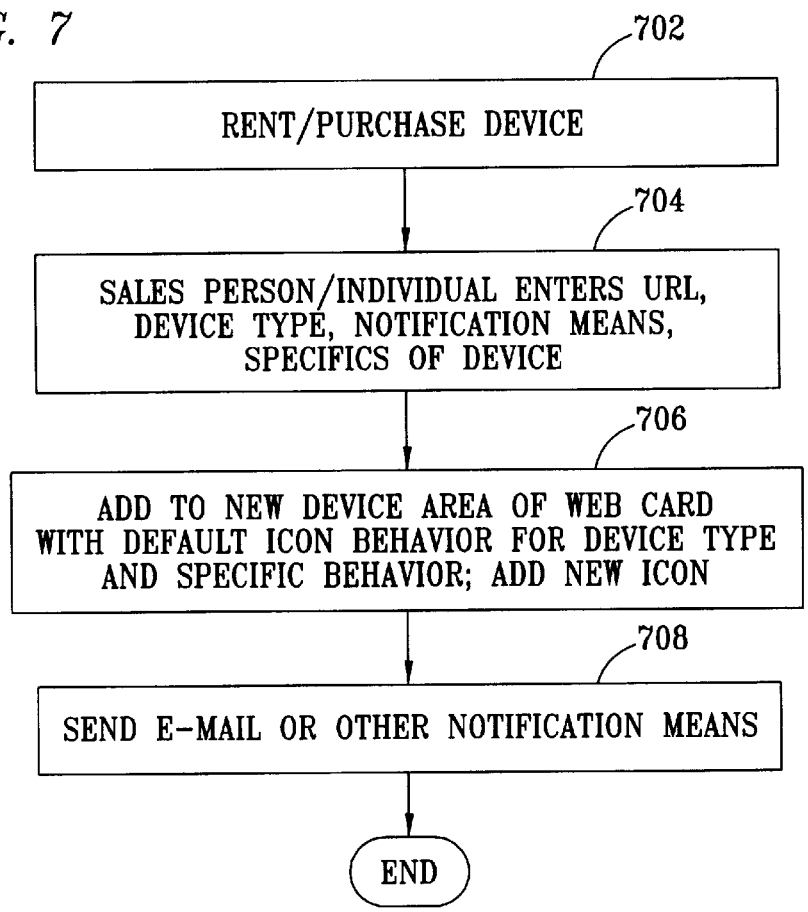

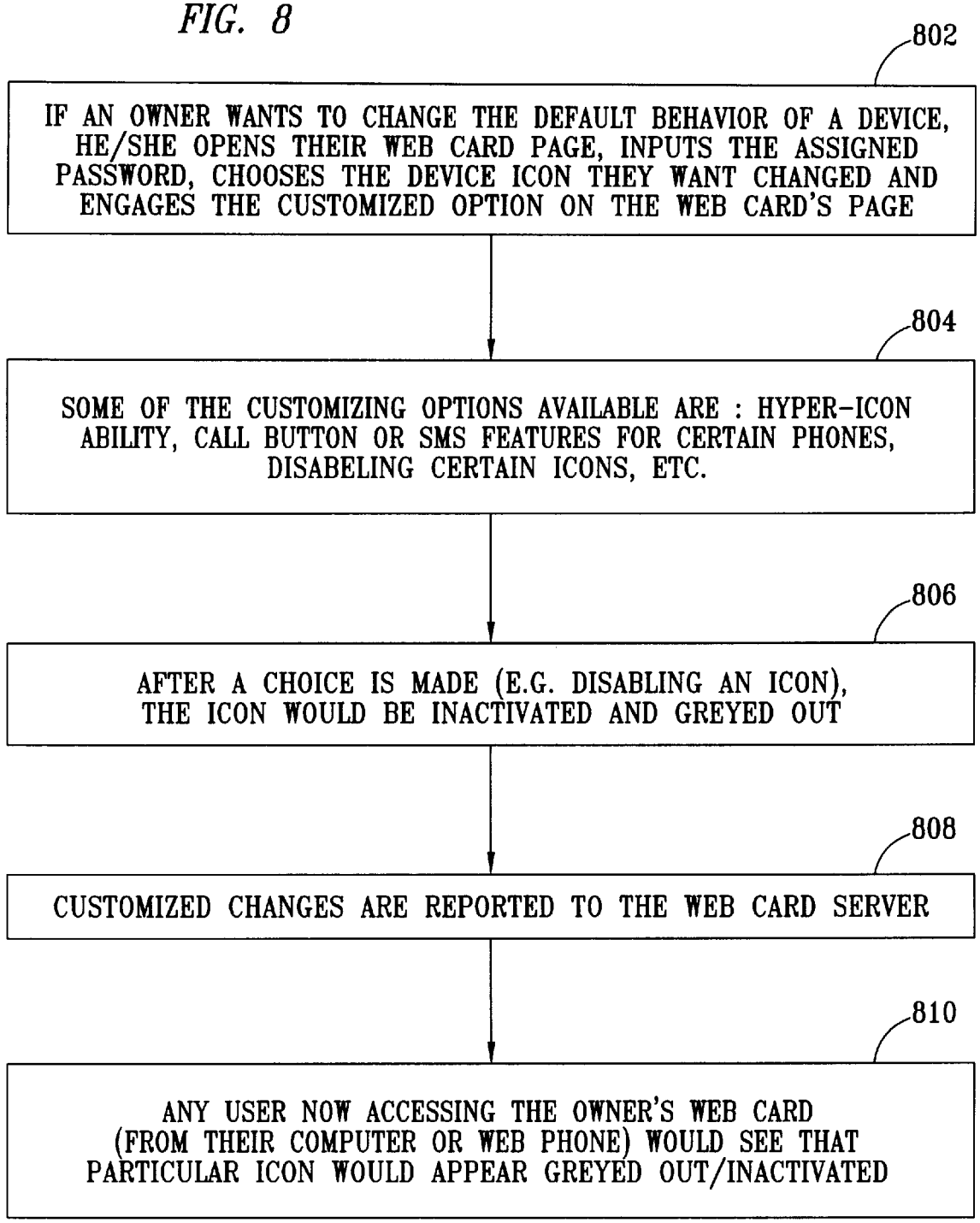

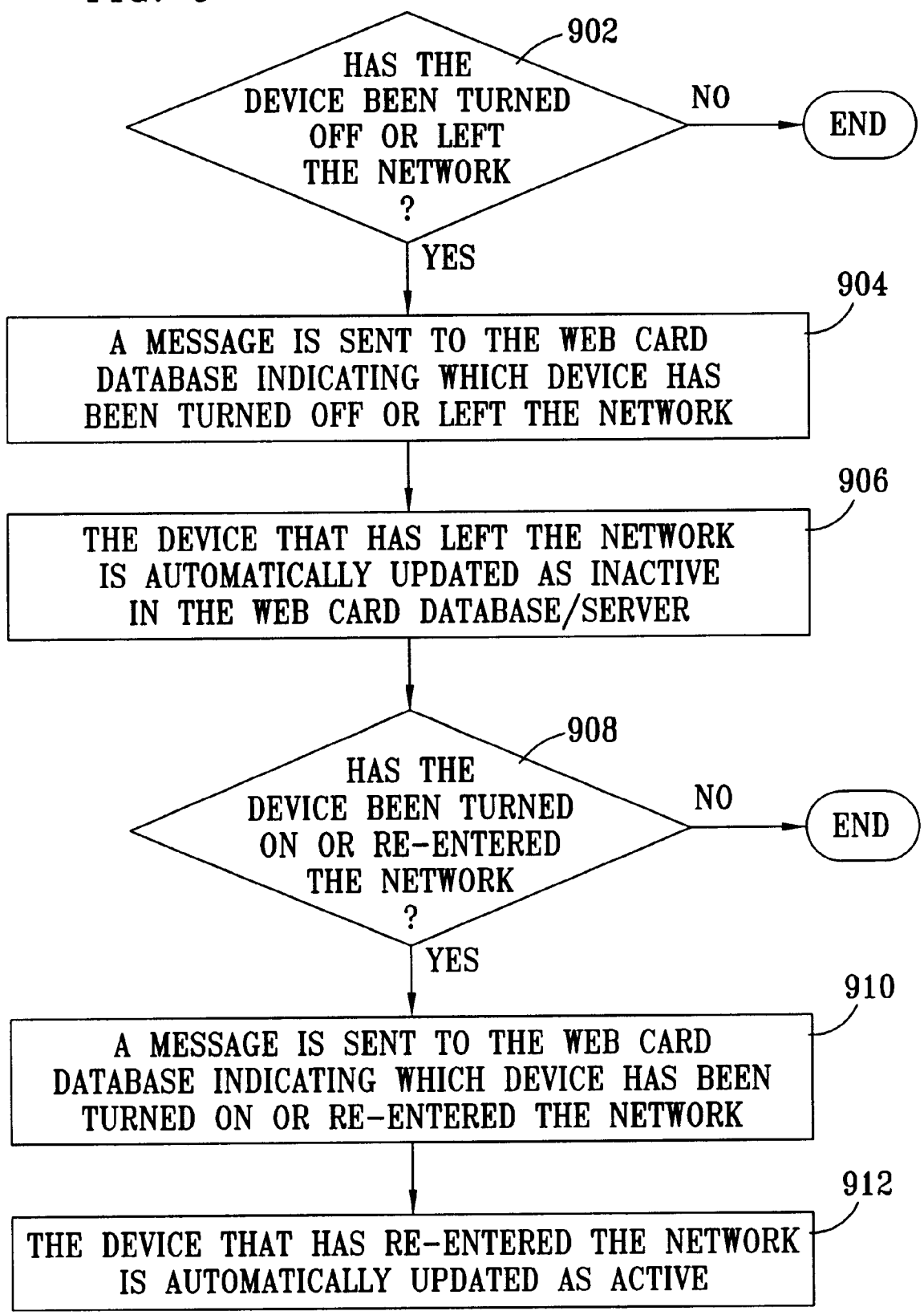

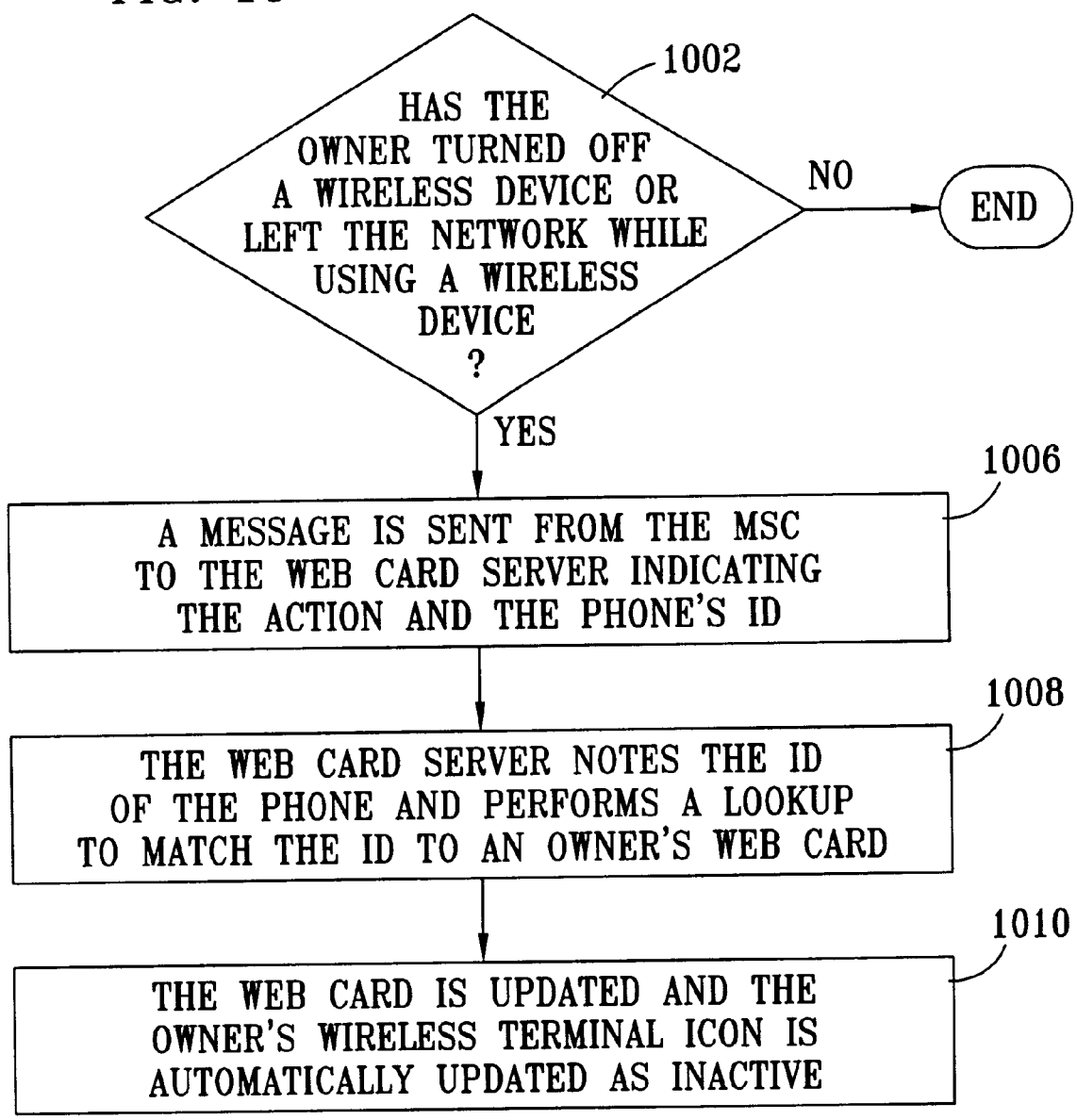

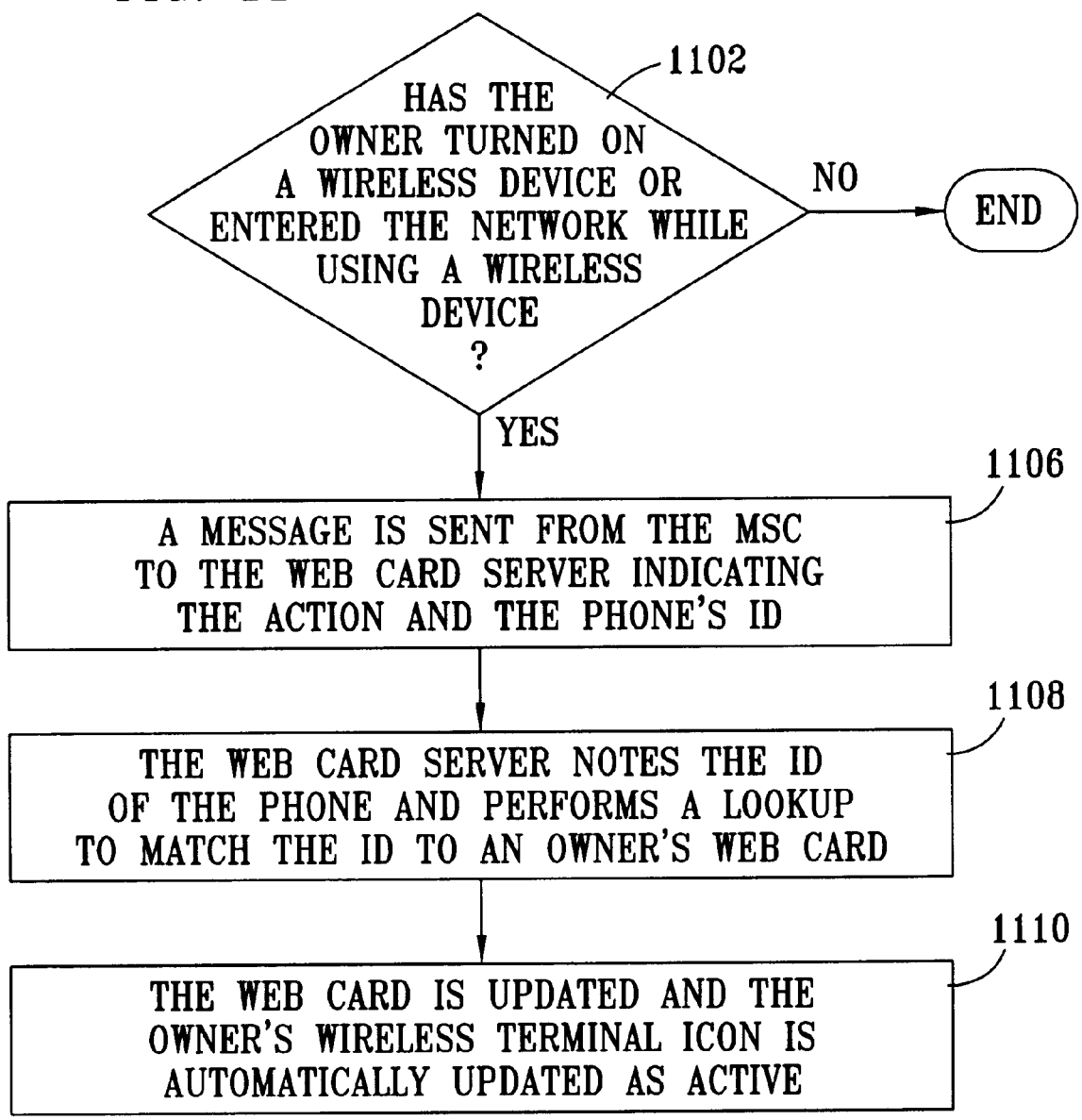

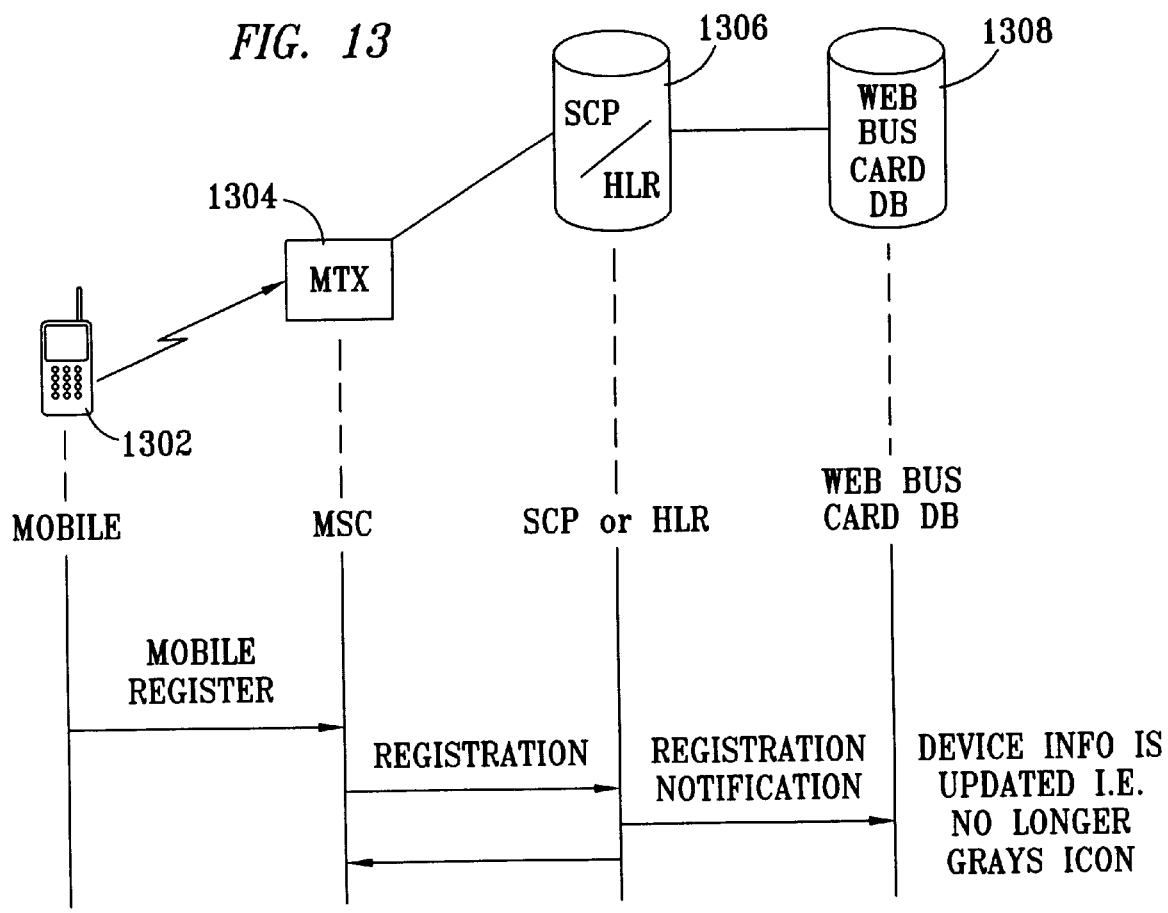
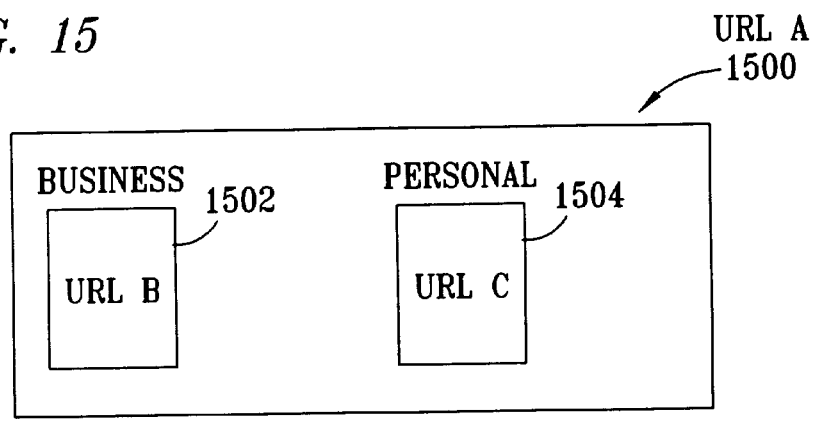

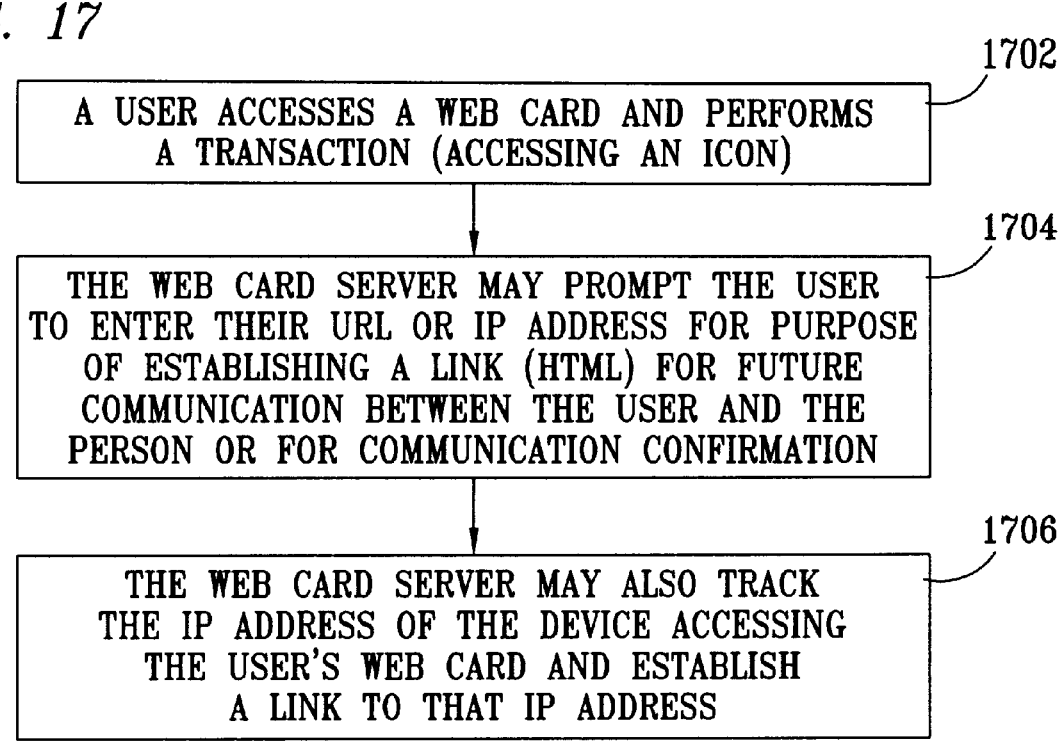
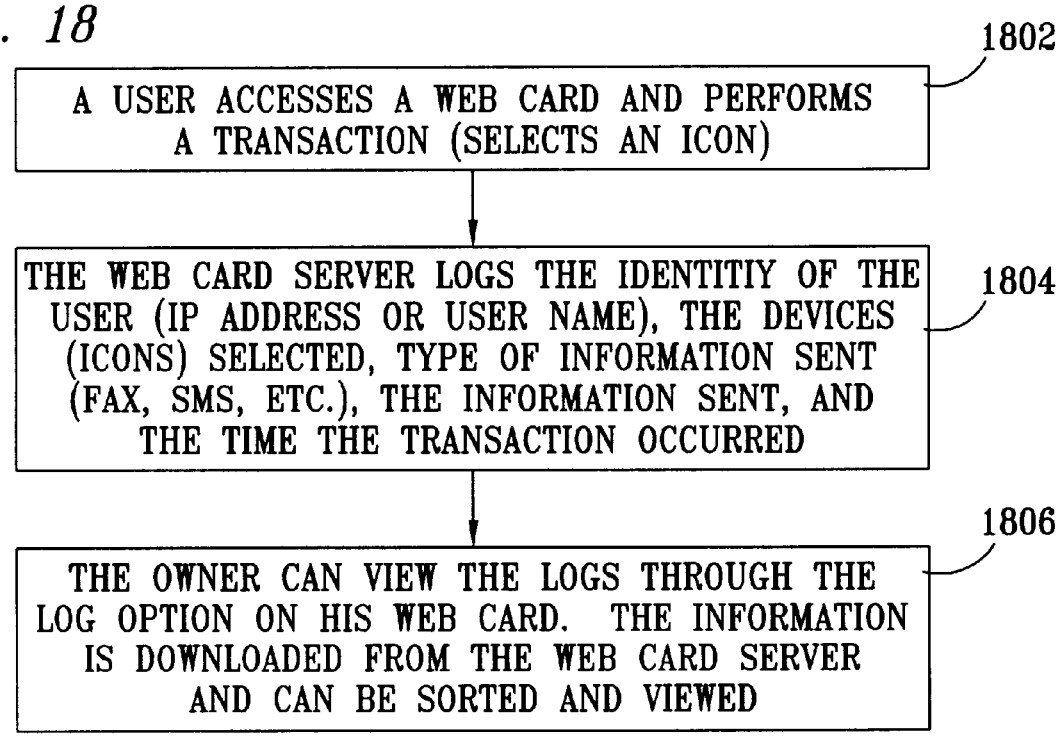

DATA PROCESSING SYSTEM AND METHOD FOR PROVIDING PERSONAL INFORMATION IN A COMMUNICATION NETWORK

TECHNICAL FIELD

The present invention relates in general to a data processing system and method for providing information in a communication network, and more particularly, to a data processing system and method for selectively providing representations of personal information in the communication network.

BACKGROUND INFORMATION

The worldwide network of computers commonly known as the "Internet" has seen explosive growth in the last several years. This growth has been typically fueled by the introduction and widespread use of "web" browsers that allow for simple graphical user interface-based access to network servers. Such network servers typically support documents formatted as "web pages." The "world wide web" (www) is a collection of servers on the Internet that utilize the Hyper-Text Transfer Protocol (HTTP). HTTP is a known application protocol that provides users access to files using a standard page description language referred to as Hyper Text Mark-up Language (HTML). It should be noted that files may be provided in different formats such as text, graphics, images, sound, and video, among others. HTML provides basic document formatting and allows a developer to specify "links" to other servers and files. Use of an HTML-compliant client browser involves specification of a link via a Uniform Resource Locator, known commonly by the acronym "URL." Upon specification of a URL, a client may make a TCP/IP (Transmission Control Protocol/Internet Protocol) request to the server identified in the link and receive a "web page" in return, where the "web page" is a document formatted according to HTML.

Currently, many individuals have personal web pages on the Internet to provide personal information to others communicating via the world wide web. Through the use of such personal web pages, individuals may advertise goods or services they provide, as well as information about themselves, to the general public. Given the general accessibility of web pages by the public, individuals typically limit personal information displayed on their web page to a discrete amount of data. When information is disseminated about an individual via a web page, some of the information may include phone numbers, e-mail addresses, fax numbers, mobile telephone numbers, and pager numbers, as well as other communication services. However, even though a person is able to access another person's web page via the Internet, the accessing party must use a separate communication device to access the web page owner. For example, the accessing party must use a telephone to call the individual's land line telephone, page the person, or call the owner's cellular or mobile phone. Furthermore, it is only after attempting to reach the owner's communication device that the accessing party is able to determine that the communication device is inactive or inaccessible. Thus, the accessing party may lose valuable time in attempting to contact an individual associated with a web page, or even a regular paper business card, through communication devices listed thereon that are currently inaccessible.

Therefore, a need exists for a data processing system and methodology for providing information, including accessibility, about an individual in a communication system.

SUMMARY OF THE INVENTION

The previously mentioned needs are fulfilled with the present invention. Accordingly, there is provided, in a first form, a communication system. The communication system includes a web card database server for storing a plurality of access values. Each of the plurality of access values corresponds to one of a plurality of communication media and a first entity. Additionally, the communication system includes a communication network capable of selectively communicating a first portion of the plurality of access values in response to a first control signal.

Additionally, there is provided, in a second form, a communication system. The communication system includes a communication network for selectively providing a first control signal. The communication system also includes a data processing system for displaying a plurality of icons. Each of the plurality of icons corresponds to one of a plurality of roles of an entity. The data processing system generates a plurality of uniform resource locators. Each of the plurality of uniform resource locators corresponds to one of the plurality of roles of the entity. The data processing system displays a first plurality of information values corresponding to the entity in response to the first control signal. The communication system also includes a memory for storing the first plurality of information values corresponding to the entity. The memory provides the first plurality of information values in response to a first one of the plurality of uniform resource locators.

Furthermore, there is provided, in a third form, a method for utilizing a web page in a global communication network. The method includes the steps of accessing the web page in the global communication network and placing a plurality of icons on the web page. Each of the plurality of icons corresponds to one of a plurality of roles of an entity. The method also includes the step of associating each of a plurality of sets of communication devices with each of the plurality of icons.

Furthermore, there is provided, in a fourth form, a method for operating a global communication network. The method includes the steps of accessing a web page corresponding to an entity in the global communication network and indicating availability of each of the plurality of communication devices for use in communicating with the entity. The web page includes the plurality of communication devices.

There is also provided, in a fifth form, a data processing system for implementing a business card. The data processing system includes a server for providing a web card page. The web card page includes an entity associated with the web card page and a device icon corresponding to a communication device controlled by the entity. The data processing system also includes a device for accessing the device icon to selectively enable the communication device to access the entity.

There is provided, in a sixth form, a business card in a data processing system. The business card includes at least a portion of a web card page, an entity title, and a device icon hyperlinked to a corresponding communication device under the control of said entity.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 6A illustrates, in flow diagram form, a flowchart for registering or updating a web card page;

FIG. 6B illustrates, in flow diagram form, a remaining portion of the flowchart illustrated in FIG. 6A;

FIG. 7 illustrates, in flow diagram form, a methodology for updating a web card page;

FIG. 8 illustrates, in block diagram form, a methodology for modifying a default behavior of a communication device in a communication network in accordance with one embodiment of the present invention;

FIG. 9 illustrates, in flow diagram form, a methodology for indicating that applications available in a communications network are inactive in accordance with one embodiment of the present invention;

FIG. 10 illustrates, in flow diagram form, a methodology for indicating to a web card database that a communication device has left the network in accordance with one embodiment of the present invention;

FIG. 11 illustrates, in flow diagram form, a methodology for indicating that a communication device has entered a communication network in accordance with one embodiment of the present invention;

FIG. 13 illustrates, in partial block diagram form, partial timeline form, a methodology for automatically updating a web card database in accordance with one embodiment of the present invention;

FIG. 15 illustrates, in block diagram form, a display device in accordance with one embodiment of the present invention;

FIG. 17 illustrates, in flow diagram form, a methodology for linking a user to a web card in accordance with one embodiment of the present invention;

FIG. 18 illustrates, in flow diagram form, a methodology for logging communications to a web card in accordance with one embodiment of the present invention;

DETAILED DESCRIPTION

Figure 1:
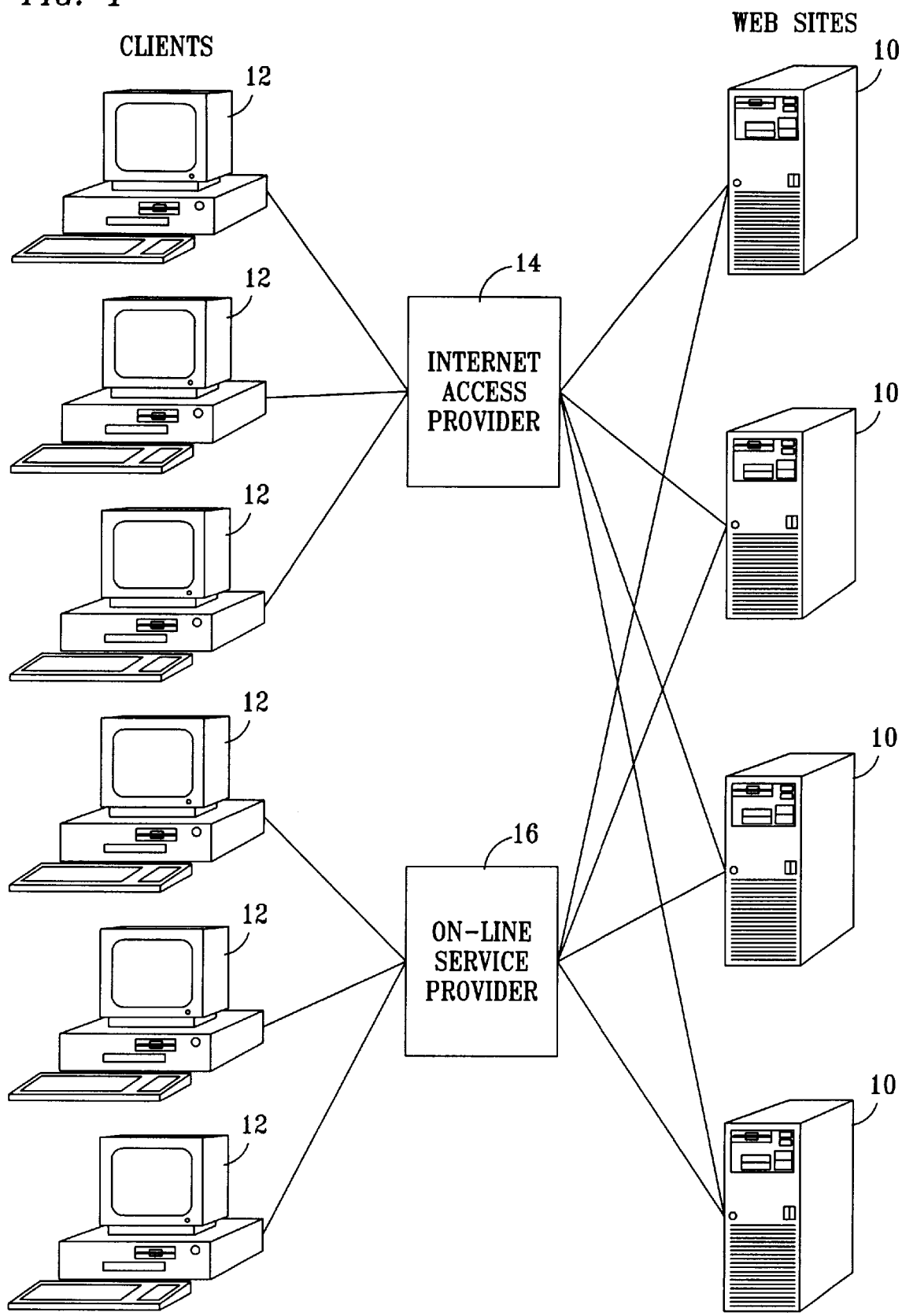
FIG. 1 illustrates, in block diagram form, a communication network.

The present invention implements a data processing system and methodology for allowing individuals to have personal communication services pages, referred to as web card pages, that are accessible by other individuals, via communications networks such as the Internet. The web card page of the present invention serves a similar purpose as today's business cards by providing references to available communication devices that may be used to access an individual. Such communication devices may include facsimile machines, telephones, cellular telephones, e-mail addresses, pagers and the like.

In addition to providing such information via the Internet, the web card page of the present invention performs an active feedback operation. Specifically, this active feedback operation represents each of the communication media that may be used to access an individual by "hyper-icons." These hyper-icons are grouped by the roles that a person plays and are sensitive to both the status of the owner of the web card page and the devices that the owner of the web card page owns and utilizes. In one embodiment of the present invention, the availability of devices used by the owner may be indicated by a corresponding hyper-icon being "greyed-out" or by the hyper-icon not being displayed at all. Should a party accessing the web card page desire to contact the web card page owner via one of the communication devices, the hyper-icon associated with that device may be accessed to indicate that information is provided to be conveyed to the owner of that web card page. In the alternative, a document to be sent may be "dragged-and-dropped" onto the hyper-icon for delivery.

Additionally, in one embodiment of the present invention, the web card page is an active web card page that makes use of the Internet, the Intranet, or any data network to allow ubiquitous access to many forms of communication. Any browser (such as Netscape™, Explorer™, and the like) is capable of displaying the interface of the present invention, as well, as all the communications media, or devices. As stated above, in one embodiment of the present invention, the various communications media are represented by hyper-icons that indicate device status and serve as the portals to various communications media. By providing such a mechanism, the present invention implements one point of contact to all forms of outbound messaging communications to a particular person or company. Such contacts may include e-mail, facsimile transmissions, voice-mail messaging, wireless data (examples of which are: SMS (short message service) CDPD (Cellular Digital Packet Data)), paging messaging, multimedia messaging including text, video, images, audio, or a mixture of these messages, HTML pages or documents, and voice media including office, home, and cellular/web card phones.

In one embodiment of the present invention, the implemented interface is "customizable" to suit the needs and desires of a web card page owner. Therefore, the owner can organize the web card page as a grouping of several roles on one page or links to several pages. Stated another way, the look and organization of the web card page will be controlled by the page owner.

Furthermore, a person accessing a web card page implemented in accordance with one embodiment of the present invention is able to save the web card page as a bookmark for later reference. The accessing party is also able to customize and create his own bookmark list of web card pages. This bookmark list may take the form of hyper-links to one page, to several pages, or active hyper-icons to the original devices or roles that maintain status sensitivity of people in the list.

In addition to status sensitivity, the present invention also discloses accessibility information corresponding to the owner of the web card page. In one embodiment of the present invention, access to different media or roles associated with the web card page owner is dependent upon the person accessing the web card page. The use of a visitor's IP (Internet Protocol) address is one method for verifying the identity of the person accessing the page. An alternative is to utilize agents with a visiting web card to allow the web card page owner to validate and present appropriate information to the accessing party.

Each of the functions of the present invention described above will subsequently be described in greater detail. Prior to that discussion, a basic framework and discussion of communications networks will be provided.

In the following description, numerous specific details are set forth to provide a thorough understanding of the present invention. However, it will be obvious to those skilled in the art that the present invention may be practiced without such specific details. In other instances, well-known circuits, devices, and network components have been shown in block diagram form in order not to obscure the present invention in unnecessary detail. For the most part, details concerning timing considerations and the like have been omitted inasmuch as such details are not necessary to obtain complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Framework of Communication Networks

FIG. 1 illustrates a communication network based on a client-server model typically utilized in the Internet. Conceptually, the Internet comprises a large network of "servers" 10 that are accessible by "clients" 12. Each of the plurality of clients 12 is typically a user of a personal computer. Clients 12 access the Internet through some private Internet access provider 14 (such as Internet America) or an on-line service provider 16 (such as America On-Line, Prodigy, CompuServe, Microsoft Network, and the like). Each of the clients 12 may run a "browser," which is a known software tool used to access the servers 10 via the access providers (14 and 16). Each server 10 selectively operates a "web site" that supports files in the form of documents and pages. A network path to a server is identified by a uniform resource locator (URL) having a known syntax for defining a network connection.

As previously mentioned, the world wide web is a collection of servers on the Internet that utilizes the Hyper Text Transfer Protocol (HTTP). HTTP is a known application protocol that provides users access to files using a standard page description language known as Hyper-Text Mark-Up Language (HTML). it should be noted that the files may be in different formats such as text, graphics, images, sound, video, and the like. HTML provides basic document formatting and allows the developer to specify "links" to other servers and files. Use of an HTML-compliant browser involves specification of a link via the URL. Upon such specification, one of the clients 12 makes a TCP/IP request to one of the plurality of servers 10 identified in the link and receives a web card page (specifically, a document formatted according to HTML) in return.

Figure 2:
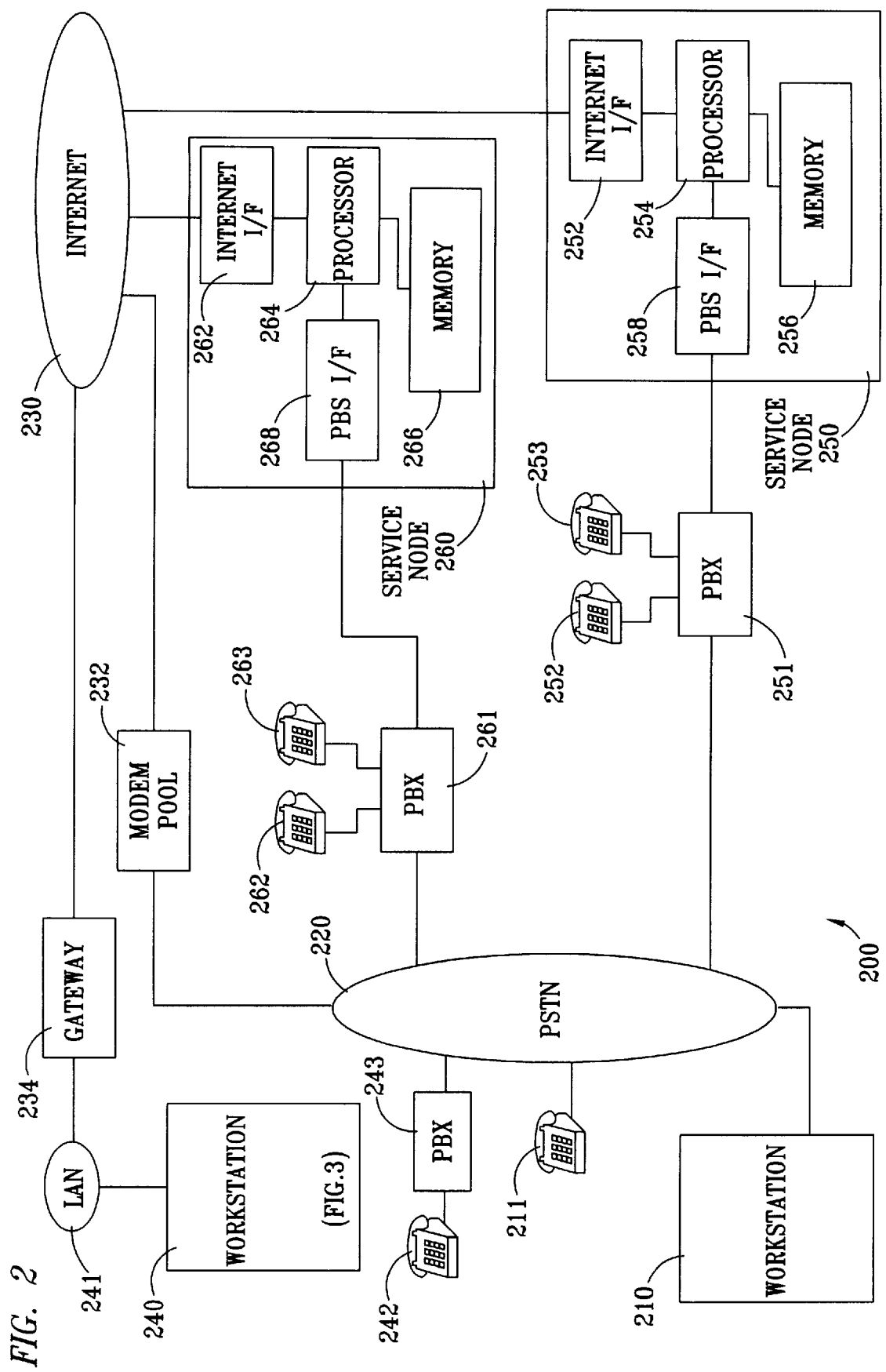
FIG. 2 illustrates, in block diagram form, a communication network utilizing a public switched telephone network (PSTN) and the Internet.

FIG. 2 illustrates a more detailed block diagram of a communication network, specifically involving a telecommunications network. Referring to FIG. 2, workstation 210 communicates information for transmission to Public Switched Telephone Network (PSTN) 220. The information may include voice, digital data, multimedia information, and the like. Telephone 211 provides a voice terminal that may be used by the operator of workstation 210. Telephone 211 is also coupled to PSTN 220. In one example of operation, assume that workstation 210 and telephone 211 are located in an operator's home. The operator may use workstation 210 to obtain access to a data network in the form of the Internet 230 via PSTN 220. A modem pool 232 links PSTN 220 to the Internet 230 for this purpose. In one embodiment of the present invention, a memory (not illustrated in FIG. 2) of workstation 210 includes browser software that the operator may use to "navigate" among various data services provided via Internet 230. As previously mentioned, the browser software may include Netscape™ Navigator, Microsoft Explorer™, and the like.

Additionally, in the communication network illustrated in FIG. 2, another data terminal in the form of workstation 240 comprises a LAN interface for formatting data for transmission over a local area network (LAN) 241. Telephone 242 provides a voice terminal to allow the operator of workstation 240 to communicate information. Telephone 242 is coupled to PSTN 220 via a private branch exchange (PBX) 243. During a second example of operation, workstation 240, LAN 241, telephone 242, and PBX 243 may be located at an operator's place of business. The operator may use workstation 240 to obtain access to a data network in the form of Internet 230 via LAN 241. An Internet gateway 234 links LAN 241 to Internet 230 for this purpose. It should be noted that a memory (not illustrated in FIG. 2) of workstation 240 stores browser software that the operator may use to navigate among the various data services provided via the Internet 230.

Data service node 250 is connected to Internet 230 to provide data services. Data service node 250 comprises an Internet interface 252, a processor 254, and a memory 256. Memory 256 stores instructions to be executed by processor 254 and data to be used by processor 254 in executing those instructions. In particular, memory 256 stores HTTP server software that enables data service node 250 to forward world wide web card pages to workstations 210 and 240 over the Internet 230 upon receipt of messages from either one or both workstations 210 and 240 requesting those web card pages.

As is conventional in the operation of the world wide web, data service node 250 downloads HTML code to workstation 210 in order to display the web card pages on a display device therein. The HTML code is stored in a memory of workstation 210 and is executed by workstation 210 when icons displayed on the web card pages are selected by the operator of workstation 210 to send a message to data service node 250. Data service node 250 subsequently responds to the message to execute a command corresponding to the icon.

Some icons may include data entry fields and textual instructions for filling of the data entry fields by the operator of workstation 210. When such icons are selected at workstation 210, downloaded HTML instructions are executed at workstation 210 to send a message incorporating the content of the data entry field to the data service node 250.

HTTP instructions stored in memory 256 of service node 250 enable data service node 250 to receive messages from workstation 210 and to execute commands corresponding to those messages. Memory 256 may store additional software applications and languages other than HTTP in alternate embodiments of the present invention. These applications may then be executed in response to receipt of particular messages by the HTTP software.

According to one embodiment of the present invention, data service node 250 further comprises PBX interface 258 to connect processor 254 to PBX 251. PBX interface 258 enables processor 254 to communicate with PBX 251 using standard Advanced Intelligent Network (AIN) protocols to control call processing and to obtain status information from PBX 251. PBX 251 connects voice terminals, in the form of telephones 252 and 253, to PSTN 220. Additionally, PBX 251 includes Automatic Call Distribution (ACD) software for monitoring the status of and distribute incoming calls to each of telephones 252 and 253.

Additionally, a data service node 260 is also connected to Internet 230 to provide data services. Like data services node 250, data service node 260 comprises Internet interface 262, a processor 264, a memory 266, and PBX interface 268. PBX interface 268 is coupled to PBX 261 that services telephones 262 and 263. Each element of data service node 260 performs a similar function as the corresponding element of data service node 250.

Figure 3:
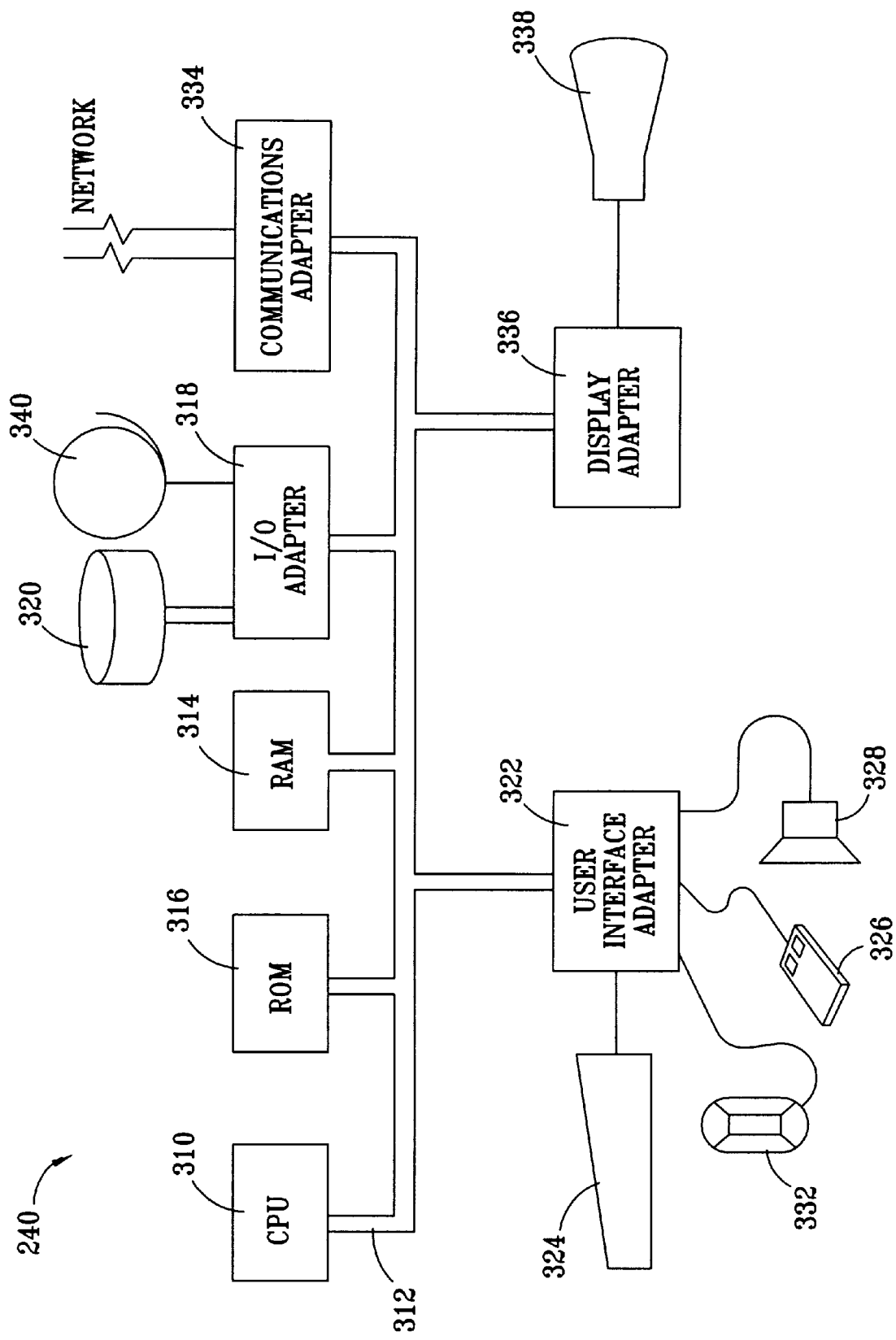
FIG. 3 illustrates, in block diagram form, a data processing system in accordance with one embodiment of the present invention.

FIG. 3 illustrates a more detailed description of workstation 240. An example is shown of a data processing system 240 which may be used in one embodiment of the present invention. The system has a central processing unit (CPU) 310, such as a microprocessor. A CPU 310 is coupled to various other components by system bus 312. Read only memory ("ROM") 316 is coupled to the system bus 312 and includes a basic input/output system ("BIOS") that controls certain basic functions of the data processing system 240. Random access memory ("RAM") 314, I/O adapter 318, and communications adapter 334 are also coupled to the system bus 312. I/O adapter 318 may be a small computer system interface ("SCSI") adapter that communicates with a disk storage devices 320 and 340. Communications adapter 334 interconnects bus 312 with an outside network enabling the data processing system to communication with other such systems. Input/Output devices are also connected to system bus 312 via user interface adapter 322 and display adapter 336. Keyboard 324, track ball 332, mouse 326 and speaker 328 are all interconnected to bus 312 via user interface adapter 322. Display monitor 338 is connected to system bus 312 by display adapter 336. In this manner, a user is capable of inputting to the system throughout the keyboard 324, trackball 332 or mouse 326 and receiving output from the system via speaker 328 and display 338. Additionally, an operating system such as AIX ("AIX" is a trademark of the IBM Corporation) is used to coordinate the functions of the various components shown in FIG. 3.

Preferred implementations of the invention include implementations as a computer system programmed to execute the method or methods described herein, and as a computer program product. According to the computer system implementation, sets of instructions for executing the method or methods are resident in RAM 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drives 320 or 340). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 4:
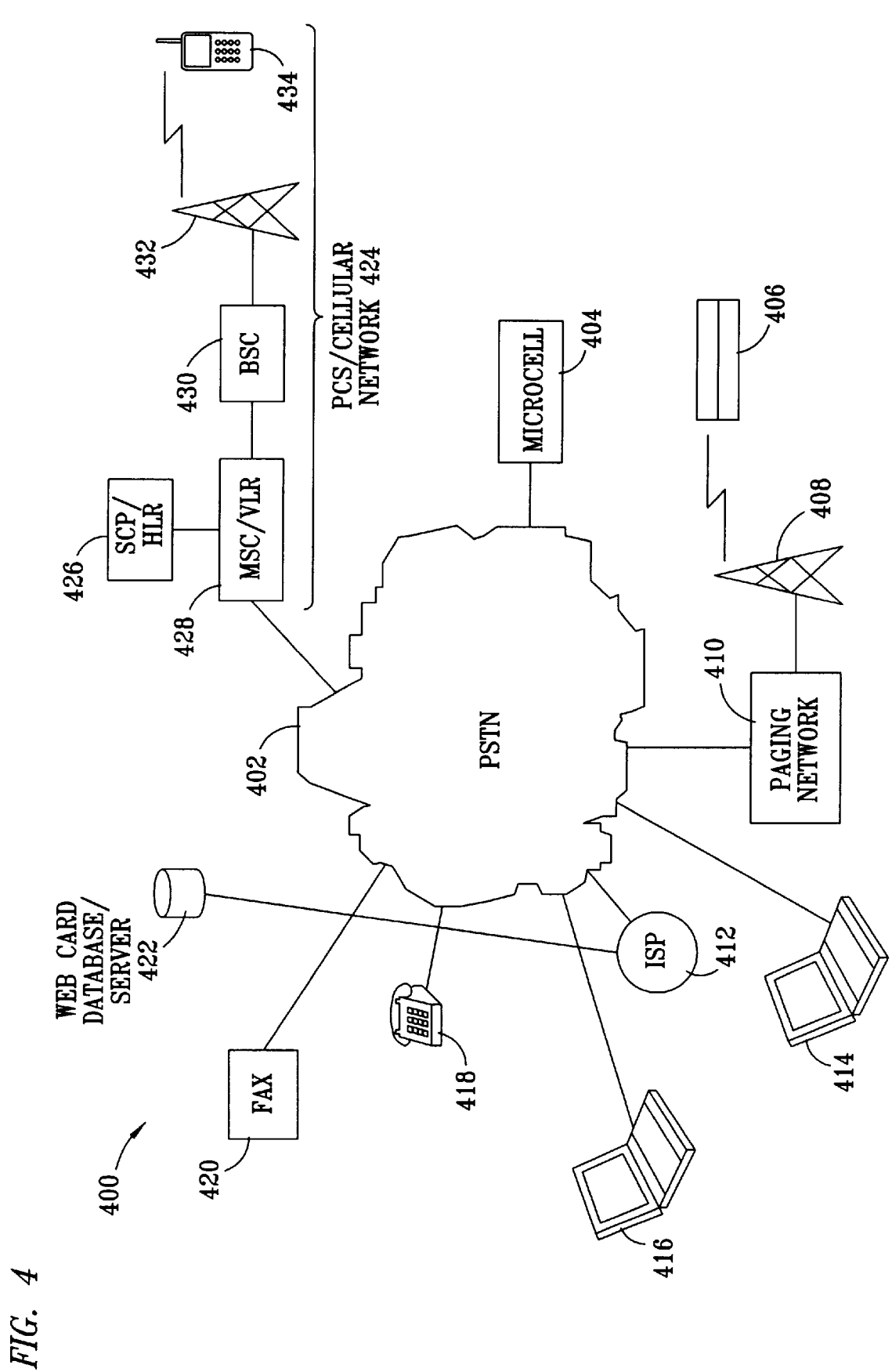
FIG. 4 illustrates, in block diagram form, one embodiment of a communication network of the present invention.
Figure 5:
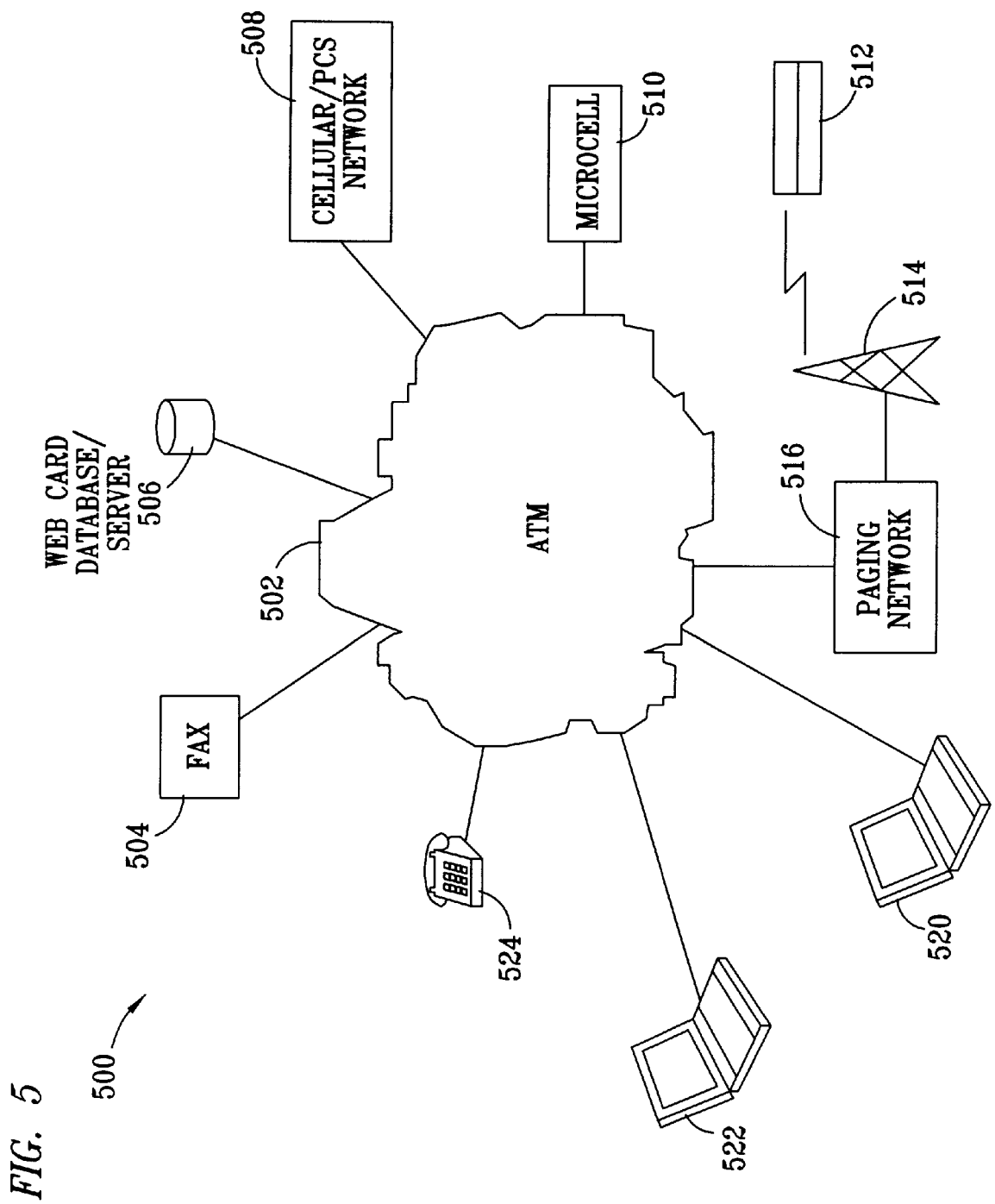
FIG. 5 illustrates, in block diagram form, one embodiment of a communication network in accordance with the present invention.

While FIGS. 2 and 3 provide a basic framework for a communication network, FIGS. 4 and 5 illustrate more detailed communication networks that include different communication media.

In FIG. 4, a public switch telephone network (PSTN) 402 is coupled to a web card/cellular network 424, a micro-cellular network 404, a paging network 410, an ISP (Internet Service Provider) 412, a telephone 418, a facsimile machine 420, and data processing systems (clients) 414 and 416. PSTN 402 routes the information to a desired end-device in a manner which is well-known to those with skill in the relevant art. Furthermore, ISP 412 is coupled to web card database/server 422.

Following will be a brief description of the functions performed by each of the communication devices of FIG. 4. First, refer to web card/cellular network 424. In web card/cellular network 424, a distributed home location register wireless network architecture is utilized to establish an infrastructure for a wireless communication network. In such an architecture, a home MSC (mobile switching center) tracks and determines where a mobile user is currently registered. A mobile user is registered on a home location register (HLR) 426 within a home mobile switching center. When the mobile user travels away from their home MSC, the mobile user is detected by a second mobile switching center (not illustrated herein). The second mobile switching center then provides information to the home MSC. The home MSC registers the location of the mobile user on a visitor location register (VLR) (not illustrated herein) associated with the visited MSC. Subsequently, when a call is received by a current MSC, the current MSC determines whether the mobile user to whom the call is directed is registered in HLR 426 or is registered in a VLR associated with the visited MSC. If the mobile user is registered in the VLR, the home MSC transmits information to the mobile user's current MSC. Through this method, the home MSC is able to transfer a call to the current MSC so that the mobile user receives the call even if the user is not within their own home MSC. A base station controller (BSC) 430 is utilized to connect all base stations, such as base station 432, to other base stations for the purpose of communicating signals and messages to and from a mobile subscriber 434 in web card/cellular network 424 and to allow for hand-off from one base station to another. web card/cellular network 424 accesses PSTN 402 to allow mobile user 434 to communicate with a portion of the communication devices 404 through 422.

Micro-cellular network 404 is coupled to PSTN 402 to provide communication capability to a smaller area than is typically serviced by the macro cell structures used by a cellular telephone user. Micro-cell applications typically include buildings, such as shopping malls, and communicate at different frequencies than are available in other cellular applications.

Paging network 410 is implemented in accordance with well-known paging techniques. Upon receiving a call from a communication device within communication network 400, paging network 410 provides control signals to a base switching center 408. Base switching center 408 subsequently provides a messaging service to pager 406 to allow a user thereof to know that a page is being processed. The steps required to implement a paging function are well-known to those with skill in the relevant art and, therefore, will not be described in greater detail herein.

A function of PSTN 402, together with ISP 412 and the plurality of clients 416 and 414 has previously been described with respect to FIG. 1.

During operation of the communication network illustrated in FIG. 4, telephone 418 accesses PSTN 402 via a network of wireline connections. PSTN 402 decodes inputs received from telephone 418 to determine a number or device which is to be accessed by a user of telephone 418 and routes the telephone call accordingly. Such a relationship between telephone 418 and PSTN 418 are well-known in the relevant art and, therefore, will not be described in greater detail herein. Similarly, facsimile 420 functions in a similar manner to telephone 418 and utilizes PSTN 402. Thus, when facsimile 420 is making a transmission, facsimile 420 accesses PSTN 402. PSTN 402 subsequently decodes the access signal provided by facsimile 420 to access another one of the communication devices or another facsimile coupled to PSTN 402.

In the present invention, web card database/server 422 provides a data processing system for storing personal information associated with individual users having a web card page accessible through the Internet and ISP 412. Additionally, web card database/server 422 stores information about the accessibility of communication devices associated with an individual's web card page. Operation and use of web card database/server 422 will subsequently be described in greater detail.

Refer now to FIG. 5 for an alternate embodiment of a communication network 500 implemented in accordance with one embodiment of the present invention. In communication network 500, an asynchronous transfer mode (ATM)/502 facilitates communication with each of the plurality of devices, such as telephones, facsimiles, and the like, in a similar manner to PSTN 402. However, it should be noted that an ATM is implemented to accurately and efficiently communicate the voice, data, and multimedia information. In contrast, a PSTN network is typically used to communicate voice information, such as that transferred via telephones, mobile telephones, and the like. The use and implementation of both PSTN communication networks and ATM communication networks is well-known to those with skill in the data processing art and, therefore, will not be described in greater detail herein.

Operation of Communication Networks

Assume that in one application of the communication networks described above, an operator of a workstation, such as workstation 240 of FIG. 2, data processing system 416 of FIG. 4 and data processing system 522 of FIG. 5 connect to the Internet via an appropriate source. Therefore, for FIGS. 2 and 4, workstation 240 and data processing system 410 may be coupled to an Internet service provider via a PSTN (220 and 402, respectively). Similarly, assume that data processing system 522 is coupled to the Internet via ATM 502. Using browser software stored in an appropriate one of workstation 240, data processing system 416, or a data processing system 522, the operator uses conventional browsing procedures to locate world wide web home pages and to display those home pages on a display device associated with that workstation.

Figure 21:
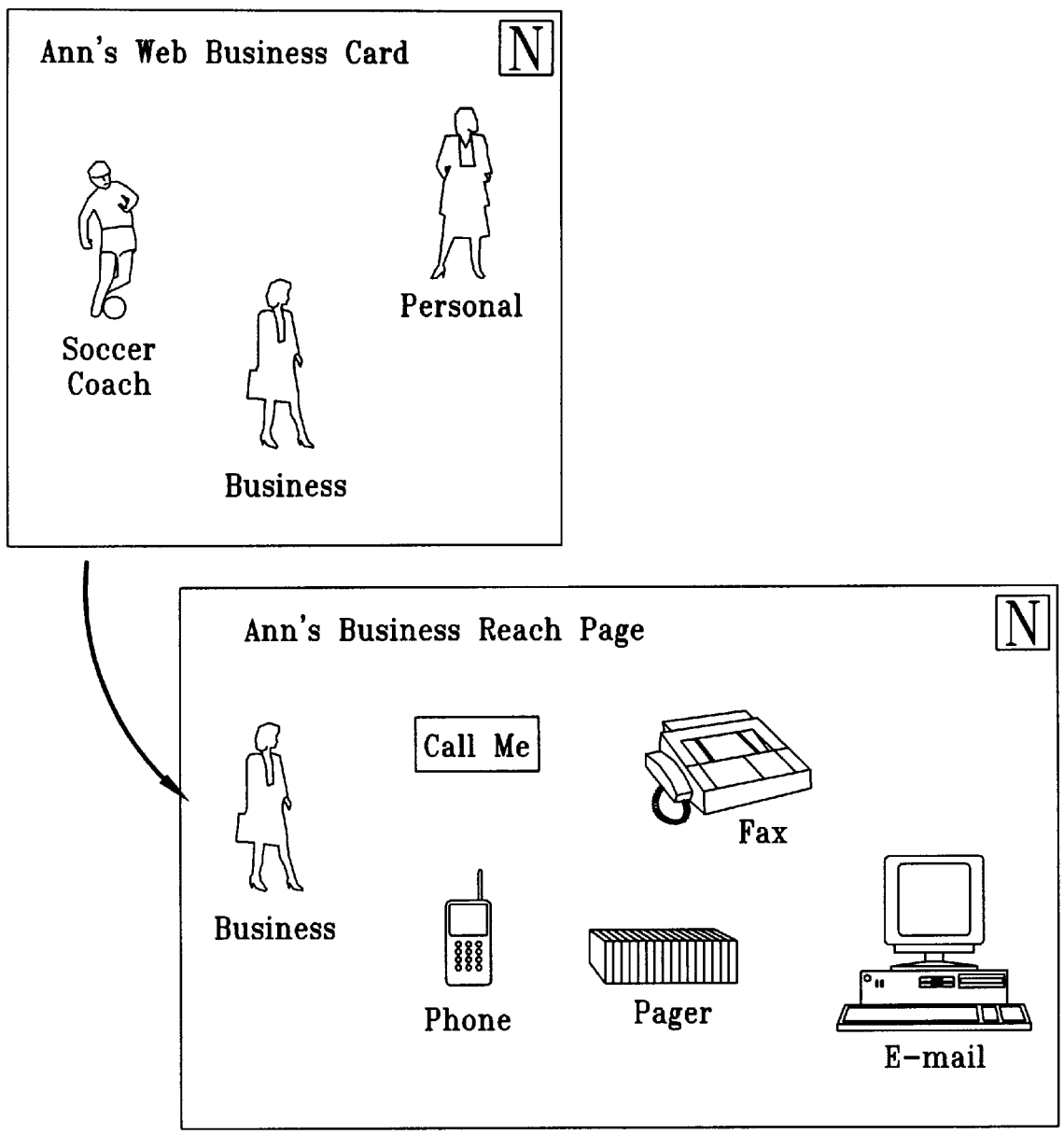
FIG. 21 illustrates an alternate embodiment of a web business card in accordance with one embodiment of the present invention.

For example, refer to FIG. 2 and assume that the operator locates and displays a home page provided by data service node 250. The home page content provides communication indicators, such as those typically found on paper business cards. An example of such a business card application implemented in accordance with one embodiment of the present invention is illustrated in FIG. 21.

It should be noted that in the following discussion, the present invention may be implemented in each of the communication networks illustrated in FIGS. 2, 4, and 5. Application of the principles of the present invention to each of these communication networks should be discernible by those with skill in the relevant art and, therefore, an application of the methodology of the present invention to each of the communication networks illustrated in FIGS. 2, 4, and 5 will not be provided in detail herein. Furthermore, it should be noted that when an example is provided using the elements disclosed in only one of FIGS. 2, 4, and 5, the use of only one of the communication networks to provide an example is for the purpose of brevity and clarity, and not for the purpose of limiting the disclosed example to one form of a communication network.

Refer now to FIGS. 6A and 6B (collectively referred to as FIG. 6), wherein a methodology for establishing a business card web card page on the Internet is disclosed. In a first step 602, a prospective web card page owner accesses a web card page located at a service node, such as service node 250 of FIG. 2, by accessing a URL corresponding to the web card page. The web card page is subsequently transferred via PSTN 220 and is provided to an appropriate workstation (210, 240). The ability to access a web card page using a URL and to engage an option, such as a registration option, is well-known to those with skill in the data processing art and, therefore, will not be described in greater detail herein. The displayed web card page then provides HTML instructions corresponding to the web card page and the steps required to perform registration thereon to the data processing system of the accessing user. This information, together with the data required to display the web card page are provided to a display device of the workstation.

Subsequently, in a step 604, a user input device, such as user input devices 414, 434, and 406 of FIG. 4, is used to input information such as a prospective owner's name, address, and other requested and pertinent information in response to the issued HTML instructions. During operation, the data provided via the plurality of user interface devices 414, 434, and 406 is provided to a user interface adapter and is subsequently processed by a central processing unit (CPU 310) in accordance with the HTML code downloaded from the communication network.

In a step 606, the web card's page performs a registration operation and then communicates a URL to the owner so that the owner may then access the web card page. The web card's page also provides a password to enable the registered owner to alter his web card page. The owner may then access his personal web card. In one embodiment of the present invention, the owner may be required to input his password before being allowed to open and alter his web card. The steps required to open an application within a web card page are well-known to those with skill in the art and, therefore, will not be described in greater detail herein.

Once the owner has opened his web card and has input a password (where required), the owner may add icons to his web card page that correspond to his communication devices by moving (sometimes via drag and drop operations) those icons from a web card's page icon repository to his web card page in a step 610.

As each icon is added to the user's web card page, a number for accessing a communication device associated with the web card page may then be input via a user interface such that the numbers may be associated with a corresponding icon in a step 612. The number corresponding to the communication devices may include phone numbers, fax numbers, e-mail addresses, and the like. Additionally, it should be noted that in a step 614, the web card page owner may also be able to personalize his icon by altering the shape, color, enabling the icon to emit a sound, or enabling the icon to emit a word when engaged. The owner may also personalize his icons by choosing a personalize option on the web card's page, as is currently allowed in most web card page development applications.

Additionally, in step 616, the owner is able to change a default behavior of his communication devices to take advantage of features that may be available for those devices. This methodology is illustrated in greater detail in FIG. 8 and will subsequently be discussed in greater detail.

When the web card page owner is finished and no longer adds icons to his web card page, the owner may exit the web card page in a step 618 using well-known techniques. Subsequently, any person who now wants to communicate with the web card page owner may do so by opening the owner's web card page through the steps of accessing a corresponding URL and choosing a device illustrated therein via an icon in a step 620.

Figure 20:
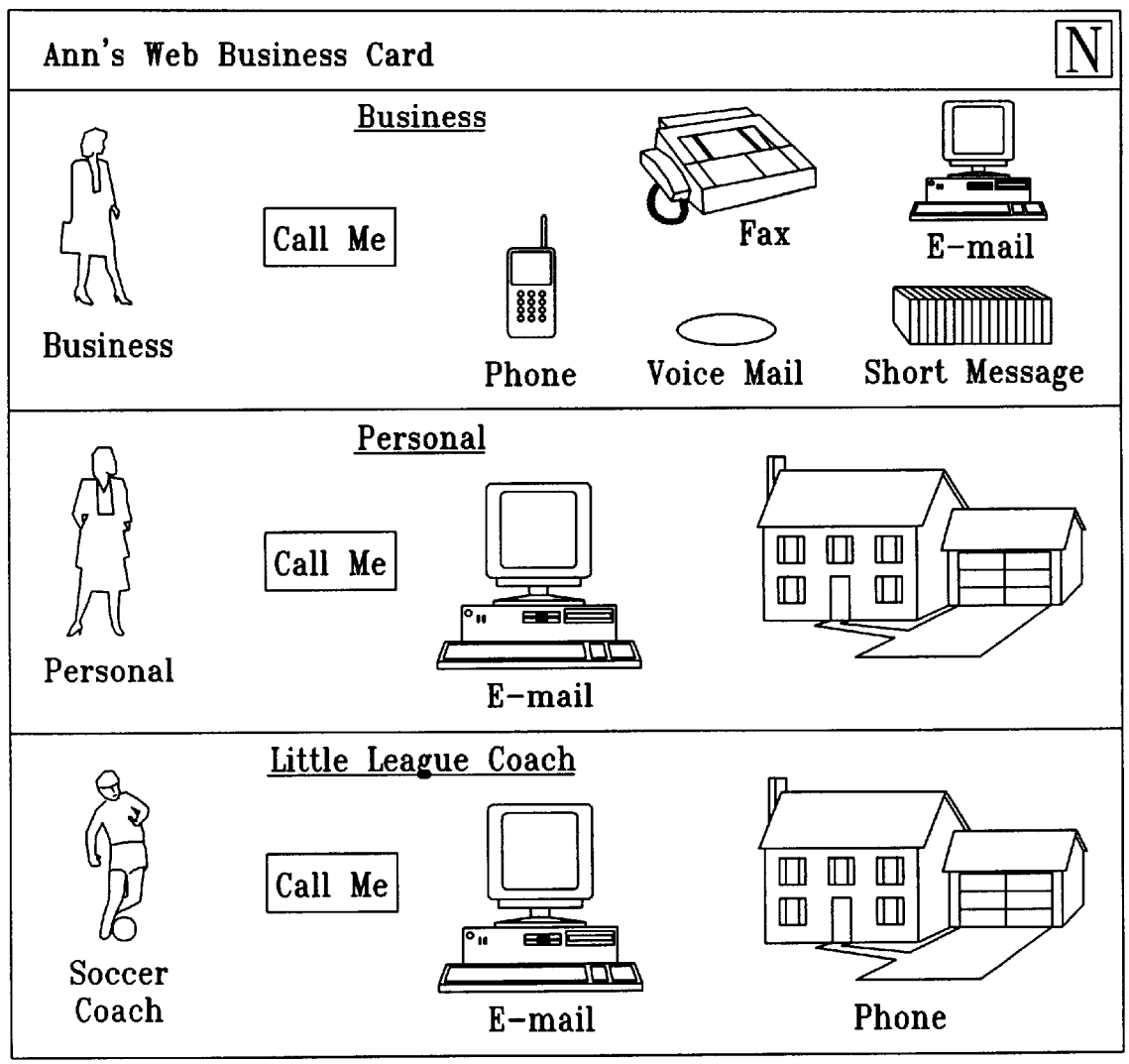
FIG. 20 illustrates an active web business card in accordance with one embodiment of the present invention.

As indicated in FIG. 20, the icons associated with the user's web card page may be status and role sensitive. In one embodiment of the present invention, the communication device associated with each icon indicate a status of the owner of the web card page. Furthermore, the availability of a communication device may be indicated by a "greyed-out" icon or text or by the removal of the icon from the user's view. Such indications of unavailability will subsequently be described in greater detail.

As previously mentioned, FIG. 20 illustrates one embodiment of a web card page that may be implemented and developed in accordance with the methodology set forth in FIG. 6. As is illustrated in FIG. 20, a web card page referred to as "Ann's Web card page" has been developed by a web card page owner, presumably "Ann." In this web card page, the owner has established three types of web card pages using the web card's page development methodology set forth in FIG. 6.

A first web card page corresponds to business applications and provides numbers for communication devices including a cellular phone number, a facsimile number, an e-mail address, a short message service and a voice mail number. Furthermore, as is illustrated in the business web card page, the owner has chosen to personalize her business web card page by including an icon of a business woman thereon. The owner has also implemented two other types of web card pages, including a personal web card page and a "Little League Coach" web card page. As may be observed from FIG. 20, the personal web card page only includes communication devices such as a home phone and an e-mail address. Similarly, the Little League Coach web card page only includes communication devices available via e-mail or a home telephone. From the plurality of web card pages set forth in FIG. 20, the roles and status of individuals may be utilized to determine a communication methodology that may be used to get in touch with an individual to which the web card pages correspond. Such role and status information is particularly useful to users attempting to access the owner of the web card page, as the information disclosed in the business cards indicates the best manner for accessing an individual depending on the current social roles and device availability.

FIG. 21 illustrates an alternate embodiment of a web card page that may be implemented using the web card page processor flow of FIG. 6. In the alternate embodiment illustrated in FIG. 21, only hyper-icons are illustrated on a web card page associated with the URL developed by the owner together with the registration procedure of the web card's page. As is illustrated in FIG. 21, a user accessing the web card page may simply click on an appropriate icon, wherein the icons indicate status and roles associated with the owner of the web card page. When one of the icons, also referred to as hyper-icons is accessed, a "Business Reach Page" is retrieved. On the Business Reach Page, each of the communication devices with which the owner of the web card page is associated and the status of the communication devices is provided therein.

A user may then access one of those communication devices to communicate with the owner of the web card page in an appropriate manner. The user may access one of those communication devices using traditional techniques, whereby a phone number is dialed to place a call, a page, or to deliver a facsimile. Additionally, and as will be explained later, alternative means may also be utilized by the user when desiring to communicate with the owner of the web card page.

Figure 22:
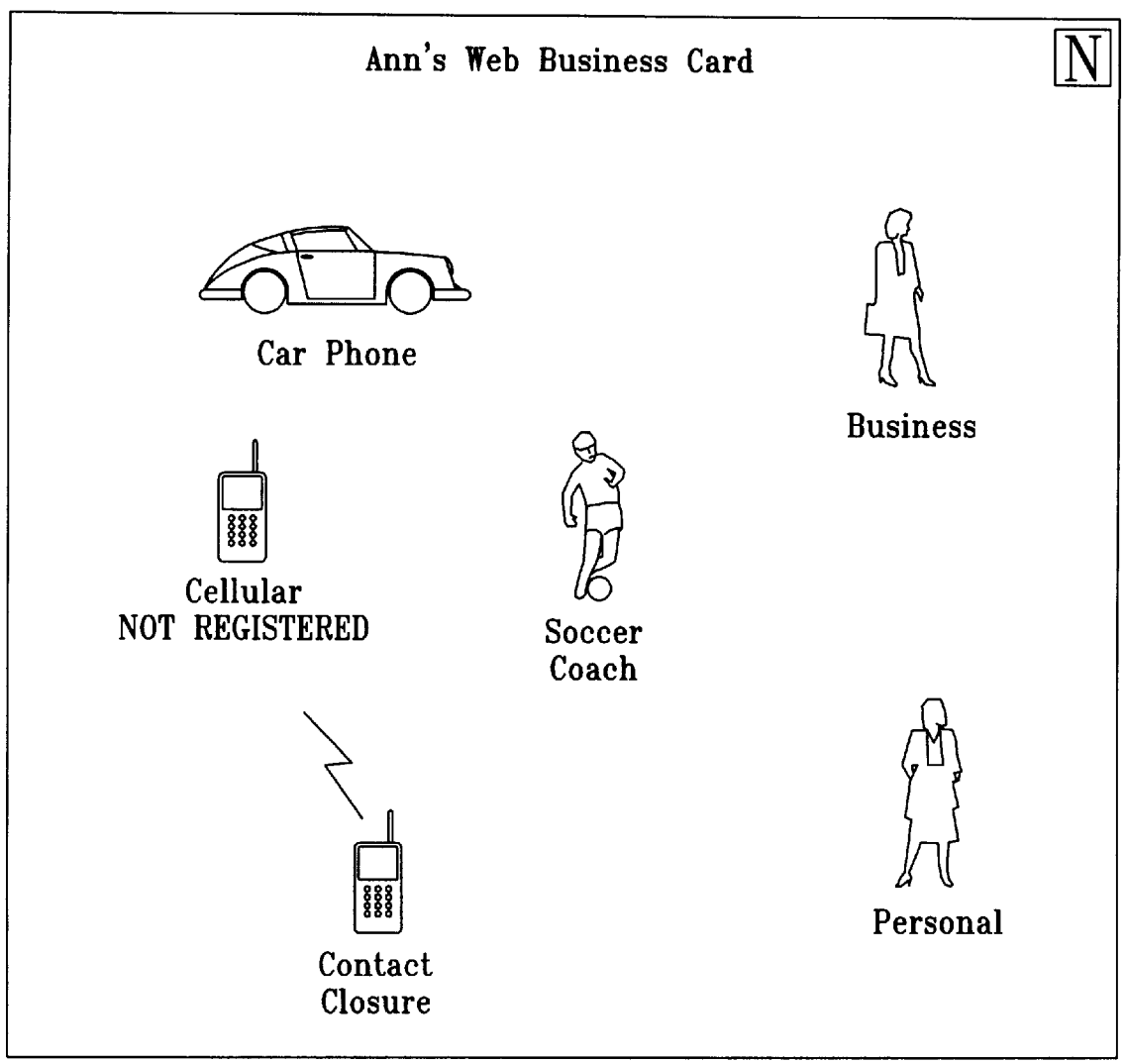
FIG. 22 illustrates an alternate embodiment of a business card in accordance with one embodiment of the present invention.

Likewise, in FIG. 22, an alternate embodiment of the present invention is illustrated, wherein certain icons are "greyed out" to indicate that they are unavailable for use. Such indications will subsequently be described in greater detail.

Modification of Information Available on a Web Card Page

It is rare that the communication devices with which a person may be associated do not change. For example, cell phones discharge, fax machines become dysfunctional, and computer systems often "crash" resulting in no e-mail communications. In addition to the unavailability of communication devices, a web card page owner may choose to add additional communication devices to allow others to communicate with them. The present invention implements a methodology for insuring that the availability of communication devices is easily determined by a user accessing the web card page and is easily updatable by the owner and/or network to ensure that the most current information is always available to the accessing user. Following will be several descriptions of methodologies implemented in accordance with alternate embodiments of the present invention to ensure that the available communication devices are illustrated and modified in accordance with the most current information available. Additionally, the following discussion will address modifications associated with the default behavior of a communication device within the web card page application of the present invention.

FIG. 7 illustrates a methodology for allowing an owner's web card page to be updated by a third party or by the owner upon the rental or purchase of a communication device in a manner disclosed in step 702. In a step 704, a third party from whom the device was rented or purchased may access the owner's web card page of the individual and enter a device type, a notification indicator, and other specifics associated with the device on the web card page. Access and entry of data to web card pages is well-known to those with skill in the art and, therefore, will not be described in greater detail herein.

With the entry of the device type into the web card page, a default icon is added to the web card page for the specific device type in a step 706. The web card page owner may then modify the icon to more accurately reflect the role and/or status to be associated with that icon, as well as specific behaviors of that icon.

If modified by a third party, after the new device has been added to the web card page, a message is sent via e-mail or by some other notification means to the web card page owner to allow them to know that a new device has been added to his web card page (step 708). When the new device has been added to the web card page, the data service node providing information about the web card page will send an indication via a web card database/server (422) that the new device has been added.

In addition to allowing a third party to update a web card page, an owner may choose to modify a default behavior of a device on his own web card page. The steps executed to change an icon's default behavior are illustrated in greater detail in FIG. 8. In a step 802, an owner accesses his web card page. The owner may access the web card page by inputting a URL corresponding to the web card page or by accessing the web location used to generate the web card page and then opening the web card page from therein. At that point, the owner may be required to input a password. The owner could then use well-known communication techniques to respond to a password query and input a correct password. Subsequently, the owner is able to choose the device icon desired to be changed by "engaging" the icon via the use of a cursor controlled by a mouse or other input device. The owner is then able to engage a customized behavior option on the web card's page and select an appropriate alternate behavior.

It should be noted that some of the customized behavior options that may be available include a hyper-icon ability implementation, a call button to enable a user of the web card page to simply press a button to make a telephone call and the like, and a short message system (SMS) feature for certain communication devices. Additionally, other behavior options may include disabling certain icons. Some of these behavior options are outlined in step 804. It should be noted that utilization of a call button is disclosed in greater detail in the aforementioned, cross-referenced, and co-pending patent application entitled "Methods and Apparatus for Originating Voice Calls," filed May 28, 1996, and having Ser. No. 08/652,659, which is hereby incorporated by reference herein. Additionally, the SMS features and a method for implementing them are discussed in greater detail in the aforementioned co-pending, and cross-referenced patent application entitled "Methods and Apparatus for Providing Communications to Telecommunications Terminals," filed Sep. 25, 1996, Ser. No. 08/718,746, which is hereby incorporated by reference herein.

After the customized behavior of a device is determined, the icon is modified accordingly. For example, should a web card page owner desire to disable an icon and take the appropriate steps outlined in steps 802 and 804 above, the icon would become inactive and either "greyed-out" or removed when displayed to the owner via a display device in a communication network. These steps are outlined in step 806.

The modification of the status of the icon is maintained and performed by a service node, such as service nodes 250 and 260 of FIG. 2. Alternatively, with reference to FIG. 4, a status of the icon is maintained within the service node such as web card database/server 422. Web card database/server 422 communicates status information to PSTN 402 via ISP 412.

Receipt of the status information is then reported to web card database/server 422 in step 808. Subsequently, when a user accesses an owner's web card page from his computer or "web phone," the status information is provided from web card database/server 422 as he accesses the URL corresponding to the user's web card page. These steps are outlined in step 810 of FIG. 8.

As discussed in step 806 of FIG. 8, when a communication device is no longer active or available for use, the icon corresponding to the communication device is modified to reflect that unavailability. The steps executed in modifying the icon displayed to a user accessing the owner's web card page are outlined in the methodology illustrated in FIG. 9.

In step 902 of FIG. 9, a service node connected to an Internet service provider determines when the device has been turned off or left the network. In the following description of FIG. 9, each of the steps will be discussed with reference to operation of the communication network of FIG. 4. It should be noted that the steps of FIG. 9 are not limited to the communication network of FIG. 4, but could also be applied to alternate communication networks, including but not limited to, those networks illustrated in FIGS. 2 and 5. Now, turning to FIG. 4 and FIG. 9, assume that if certain devices have been turned off or left the network, a message is sent to web card database/server 422 from PSTN 402 via ISP 412 to indicate the device that was turned off left the network in step 904. Step 904 will subsequently be described in greater detail.

After the device has been turned off or left the network and that absence is indicated to web card database/server 422, web card database/server 422 provides data information to a data processing system connected to ISP 412 whenever the web card page is accessed by a user. Upon receiving notice of inactivity or inability to communicate with the device, web card database/server 422 provides the appropriate control signals to enable the icon to be displayed in a special manner that indicates the communication device is inactive as in step 906. Such inactivity may be indicated by "greying out" the device, modifying the color of the device, or by displaying the device in an alternative manner.

Subsequently, in step 908, the communication network determines whether the communication device that was previously inactive has been turned on or has re-entered the network. Upon the enablement or the re-entry of the device into the network, a message is sent by PSTN 402 to web card database/server 422 via ISP 412 to indicate a device that has been turned on or re-entered the network in a step 910. The communication of this message is described in greater detail in FIG. 11.

Referring again to FIG. 9, after the communication device has been turned on or has re-entered the network and that enablement or re-entry is detected and indicated to web card database/server 422, web card database/server 422 provides updated status information to ISP 412. Subsequently, a data processing system corresponding to the web card page provides data signals to automatically indicate an active status of the communication device on a display device of a user accessing another's web card page. This step is reflected in step 912 of FIG. 9.

FIG. 10 illustrates step 904 of FIG. 9 in greater detail and provides an example of performance of this step in the context of a cellular phone for ease of comprehension. It should be noted that similar steps are executed for each of the other communication devices, taking into account the specific elements and functionality of the networks within which those communication devices function. The following discussion will refer to both FIG. 4 for a communication network that provides an illustrative framework for the methodology of FIG. 10.

In a first step 1002, PSTN 402 determines whether an owner of web card page has turned off a wireless device or left the network while using the wireless device. If the owner has turned off the wireless device or left the network, a mobile switching center (referred to as MSC 428) sends a message from SCP/HLR 426 to web card database/server 422 to indicate that the owner has turned off the wireless device or left the network via PSTN 402 in a step 1006. In addition to indicating that the owner has turned off the wireless device or left the network, SCP/HLR 426 communicates an identification number (ID), such as a portable identification number or an IMSI (International Mobile Subscriber Identity) associated with the wireless device. Web card database/server 422 subsequently stores the ID of the wireless device and performs a "look-up" operation to match the ID or IMSI to a owner's web card page in a step 1008.

MSC 428 sends a message to the owner's web card database to deactivate the owner's wireless terminal icon in a step 1010 if the communication device is turned off or leaves the network. Thus, when a web card page is accessed by a user via a data processing system (414, 416), a service node corresponding to the deactivation of any icons will be shown. The data processing system (414, 416) will then provide the appropriate control signals to illustrate an icon corresponding to the wireless device and a deactivated (greyed-out) state.

In an alternate embodiment of the present invention which allows a user to utilize existing cellular infrastructure, web card database/server 422 receives input from SCP/HLR 426 (via PSTN 402 and ISP 412) to determine when the owner of a web card page has disabled a wireless device or left the network while using the wireless device. Alternately, the web card page database/server 422 could also poll SCP/HLR 426 (via ISP 412 and PSTN 402) to determine when the owner of the web card page is no longer accessible via other communication devices. Web card database/server 422 may perform this polling operation in compliance with a configured timing requirement, such as every minute, every thirty seconds, or every ten minutes, or when a web card database/server (422) access occurs. Specifically, the web card database/server 422 would poll those owners having wireless devices or the device type to be traced to determine if it is reachable or active. By performing this polling operation on SCP/HLR 426, web card database/server 422 would know when the owners were actually available in the network. Web card database/server 422 would subsequently "push" a message to the owners web card page on data processing system to indicate that the owner has turned off the wireless device, left the network, entered the network, or turned on the wireless device. By implementing the availability notification capability in this manner, existing cellular infrastructure can be utilized to enable the SCP/HLR to function without any modifications.

FIG. 11 illustrates a methodology performed by the present invention when the communication device re-enters the network. Referring now to FIG. 11, in a step 1102, a determination is made whether the owner of a web card page has turned on a wireless device or entered the network while using the wireless device. If yes, a message is sent from SCP/HLR 426 to web card database/server 422 (via PSTN 402 and ISP 412) to indicate both that the communication device has re-entered the network or become active, and that an ID or IMSI corresponding to the wireless device (step 1106). Web card database/server 422 then retrieves the ID or IMSI of the wireless device and performs a "look-up" operation to match the ID or IMSI to the owner's web card page stored within web card database/server 422 in a step 1108.

Subsequently, messages are transferred to PSTN 402 via ISP 412, where they are disseminated to an appropriate data processing system within the communication network. The data processing system then provides the appropriate control signals to automatically update the owner's wireless terminal icon corresponding to the wireless communication device as active. It should be noted that the wireless communication device is activated and a display of that icon is dynamically updated (on web card pages being actively viewed by a user), using push technology. The use of push technology for performing such an updating operation "on-the-fly" is well-known to those with skill in the data processing art and, therefore, will not be described in greater detail herein.

Figure 23:
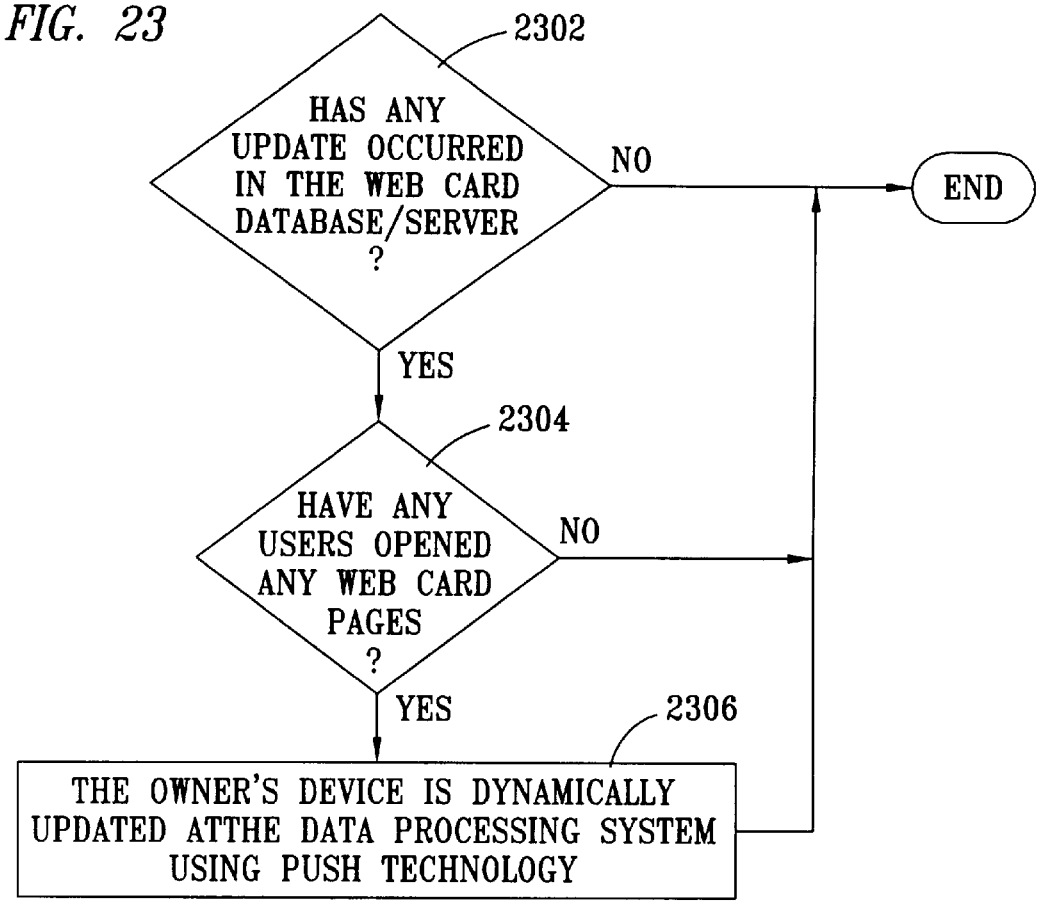
FIG. 23 illustrates, in flow diagram form, a methodology for updating a display device in accordance with one embodiment of the present invention.

After the web card page is updated and the owner's wireless terminal icon is automatically updated as active, the steps illustrated in FIG. 23 are executed in one embodiment of the present invention. In a first step of FIG. 23, a determination is made whether an update has occurred in web card database/server 422 in a step 2302. If not, a program flow terminates. However, if an update has occurred, a determination is made whether any users have opened any web card pages in a step 2304. If not, a program flow terminates. However, if any users have opened any web card pages, the owner's device is dynamically updated at the user's data processing system using push technology in a step 2306.

Figure 24:
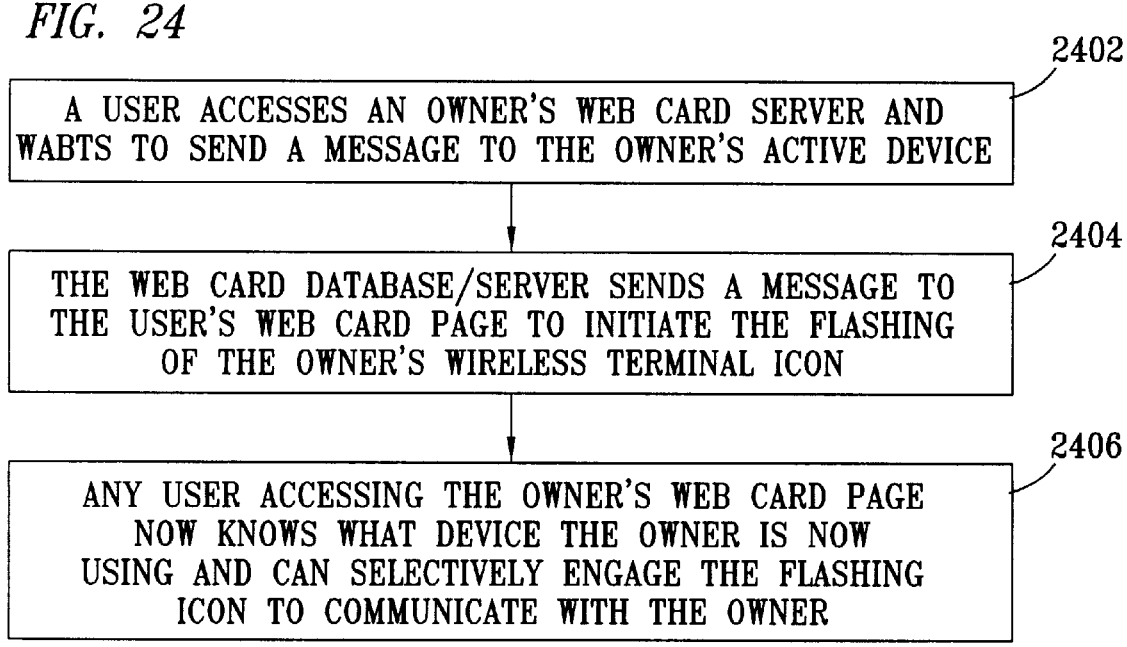
FIG. 24 illustrates, in flow diagram form, a methodology for accessing an owner's device in accordance with one embodiment of the present invention.

When the owner's communication device is active and a user desires to access the communication device, the steps set forth in FIG. 24 are executed in one embodiment of the present invention. In a step 2402, a user accesses an owner's web card page and desires to send a message to an active device illustrated thereon. In a step 2404, a web card database/server (422) sends a message to the user's data processing system to initiate the flashing of the owner's wireless terminal icon thereon. Subsequently, in a step 2406, any user accessing the owner's web card page is now able to know a device the owner is currently using and can selectively engage the flashing icon to communicate with the owner.

Figure 12:
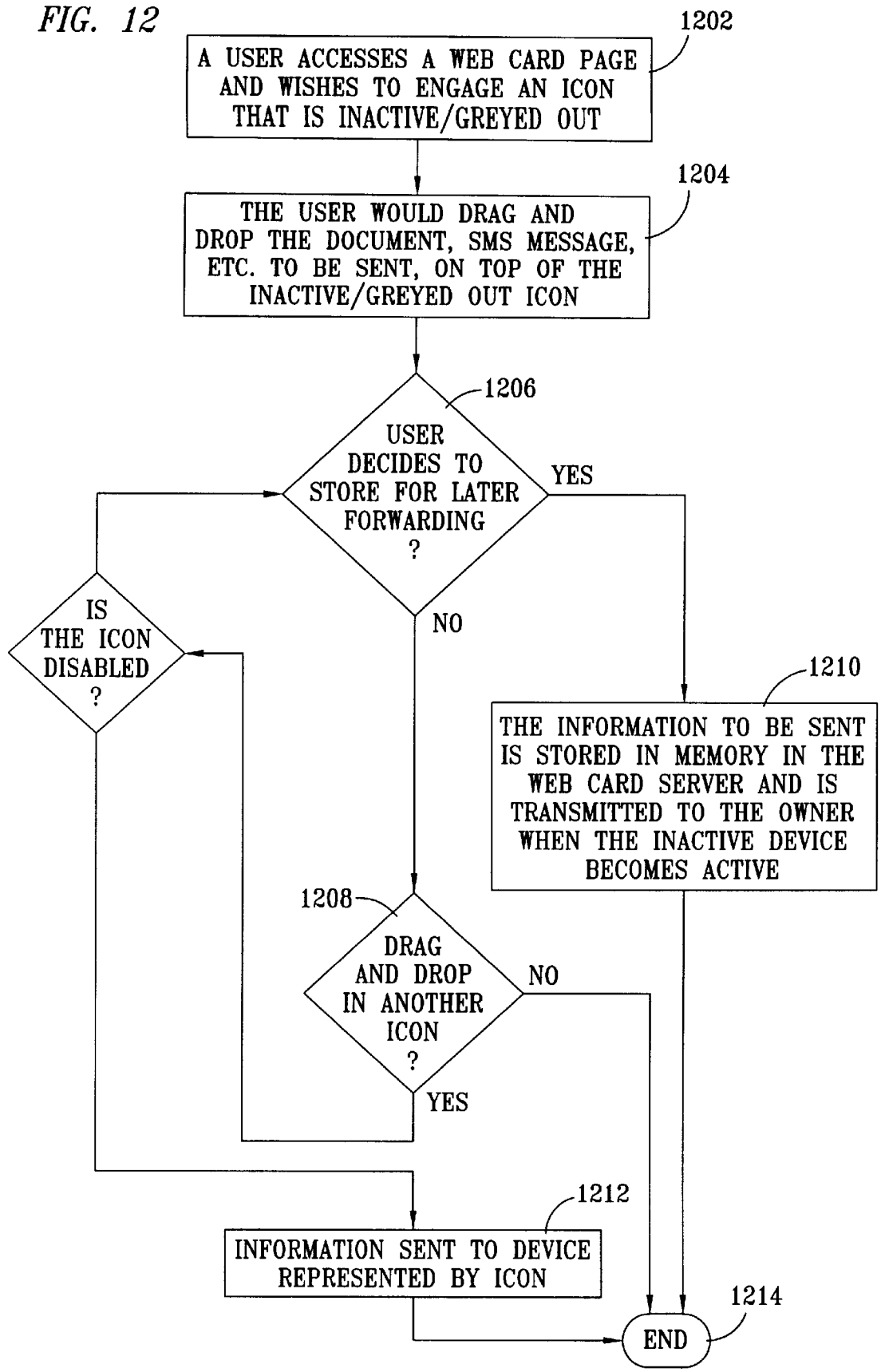
FIG. 12 illustrates, in flow diagram form, a methodology for communicating information with an inactive icon in accordance with one embodiment of the present invention.

FIG. 12 illustrates a methodology for allowing a user accessing an owner's web card page to communicate with an icon that is inactive that is implemented in accordance with one embodiment of the present invention. In a first step 1202, a user accesses an owner's web card page and wishes to engage an icon that is inactive (greyed out). The steps required to access a party's web card page and to engage an icon therein are well-known to those with skill in the art and, therefore, will not be described in greater detail herein.

Upon accessing an owner's web card page and observing that an icon corresponding to a communication device indicates that the communication device is inactive, the user may perform an operation intended to access that communication device. For example, as outlined in step 1204, the user could "drag and drop" a document onto the inactive icon, send a SMS message to the inactive icon, or perform another similar action in accordance with other well-known communication techniques. After the user "drag and drops" the document onto the inactive icon, the web card database/server determines whether the user desires to store the message to be forwarded at a later time in a step 1206.

If the message is not stored, the web card database/server determines whether the user desires to "drag and drop" the message to another icon in a step 1208. If the user does choose another icon, a determination is made as to whether the newly chosen icon is disabled. If the newly chosen icon is not disabled, the message is sent to the alternate icon and displayed to the user by an appropriate methodology therein in a step 1212. A program flow subsequently goes to step 1214. Alternatively, if the newly chosen icon is disabled, a program flow returns to step 1206. Additionally, should the user choose not to forward the message to another icon, the program flow goes to step 1214.

Alternatively, if the message is stored, the information to be sent to the inactive icon will be stored in memory within web card database/server 422 until such time that the inactive device becomes active. At that point, the information will then be transmitted to the user accessing to the web card page. This last step is outlined in greater detail of step 1210 of FIG. 12. A program flow subsequently goes to step 1214.

FIG. 13 illustrates an alternate example of operation of the present invention. In FIG. 13, a series of steps are executed to indicate that a mobile telephone user may be accessed and a communication device (typically a mobile cellular phone 1302) is no longer inactive. As is illustrated in FIG. 13, a user of mobile cellular telephone 1302 will register with the cellular network (HLR (Home Location Register)/SCP (Service Control Point) 1306). SCP/HLR 1306 then provides notification of this registration to web card database/server 1308 via a network such as ATM 502. SCP/HLR 1306 provides registration information back to the cellular network.

Figure 14:
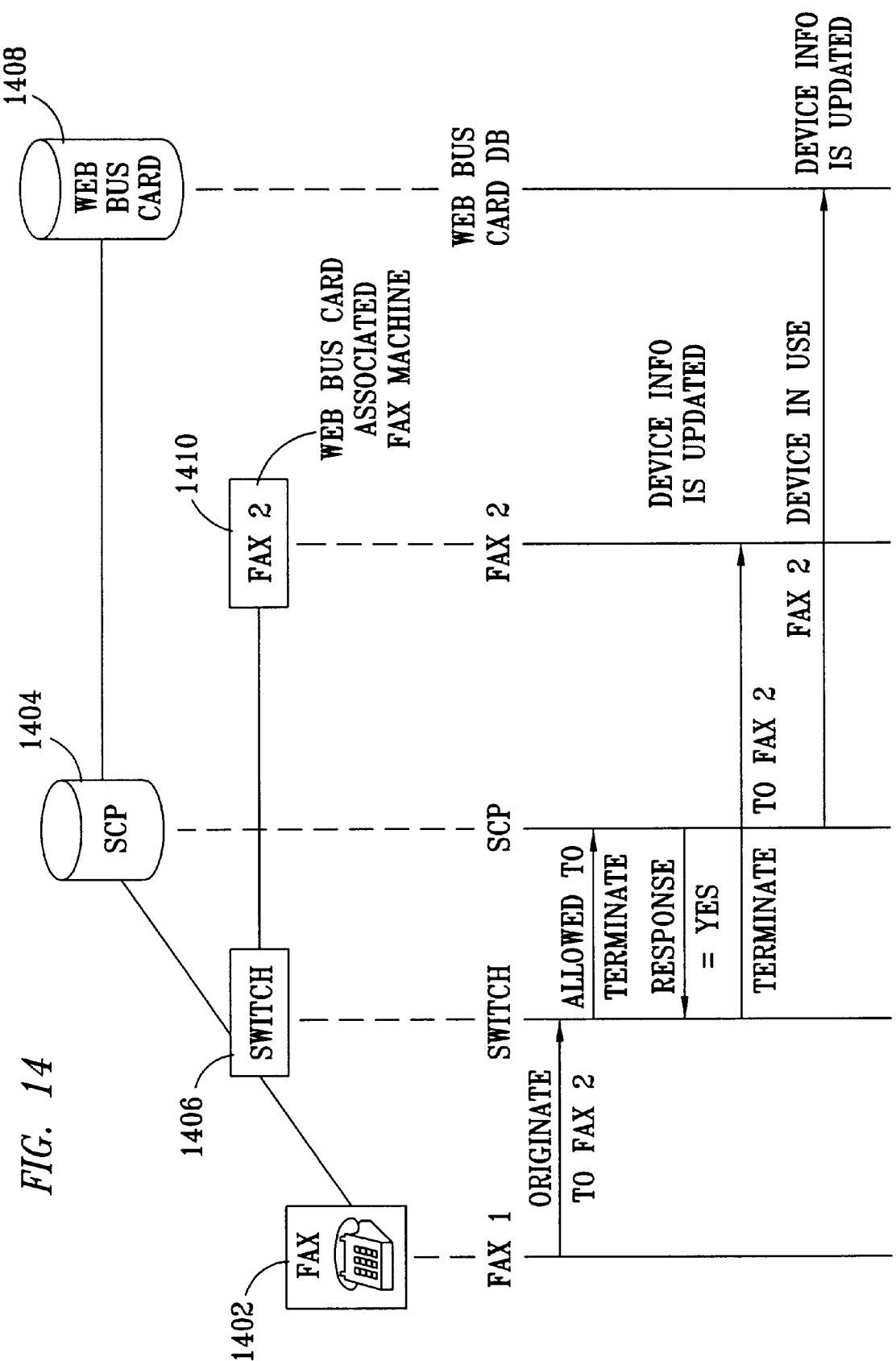
FIG. 14 illustrates, in partial block diagram form, partial timeline form, a methodology for updating information associated with a communication device in a communication network in accordance with one embodiment of the present invention.

FIG. 14 illustrates an automatic updating information for use with a facsimile transmission. As is illustrated in FIG. 14, assume that a facsimile machine 1402 originates a fax transmission to a second facsimile machine 1410. The information corresponding to the origination of the facsimile transmission is provided to switch 1406. Switch 1406 is then used to determine when the connection to facsimile machine 1410 has been allowed to terminate or has provided a response. If facsimile machine 1410 provides a response, switch 1406 connects facsimile machine 1402 to facsimile machine 1410. If, however, facsimile machine 1410 is in use or is not accessible, switch 1406 communicates this information to SCP 1404. SCP 1404 then provides this updated information regarding facsimile machine 1410 to web card page database 1408.

Controlling Access by Controlling Roles

As previously mentioned, the present invention implements web card pages, wherein each web card page corresponds to a role or status of an owner of the web card page. In one embodiment of the present invention, each of the roles or status of the owner may correspond to a different URL. For example, refer to FIG. 15. In FIG. 15, a first URL A 1500 accesses a frame that includes both personal and business roles. However, if a user merely inputs a URL B 1502, only a web card page having business role appropriate devices and behaviors will be displayed. Similarly, should URL C 1504 be input by a user, only a web card page corresponding to an owner's personal role can be displayed with the appropriate devices and behaviors for accessing that owner when in their personal role. Thus, an owner having web card pages corresponding to different roles within his life may only give out role URL's appropriate to the relationship between the business card owner and a user accessing that web card page.

Alternatively, a user name or a specific Internet Protocol (IP) address may be required to allow access to certain information on the owner's web card page. This user name or IP address may then be compared with previously stored user's name/IP address to determine a relationship between the web card page owner and the user such that only the appropriate information may be displayed to that user. Furthermore, a password and user name may also be implemented to allow different access capabilities to a web card page, wherein the access capabilities are determined by the password or user name input when the web card page is accessed. As an example, this functionality could be implemented through the use of "cookies," as used by well-known browsers such as Netscape browsers.

Figure 16A:
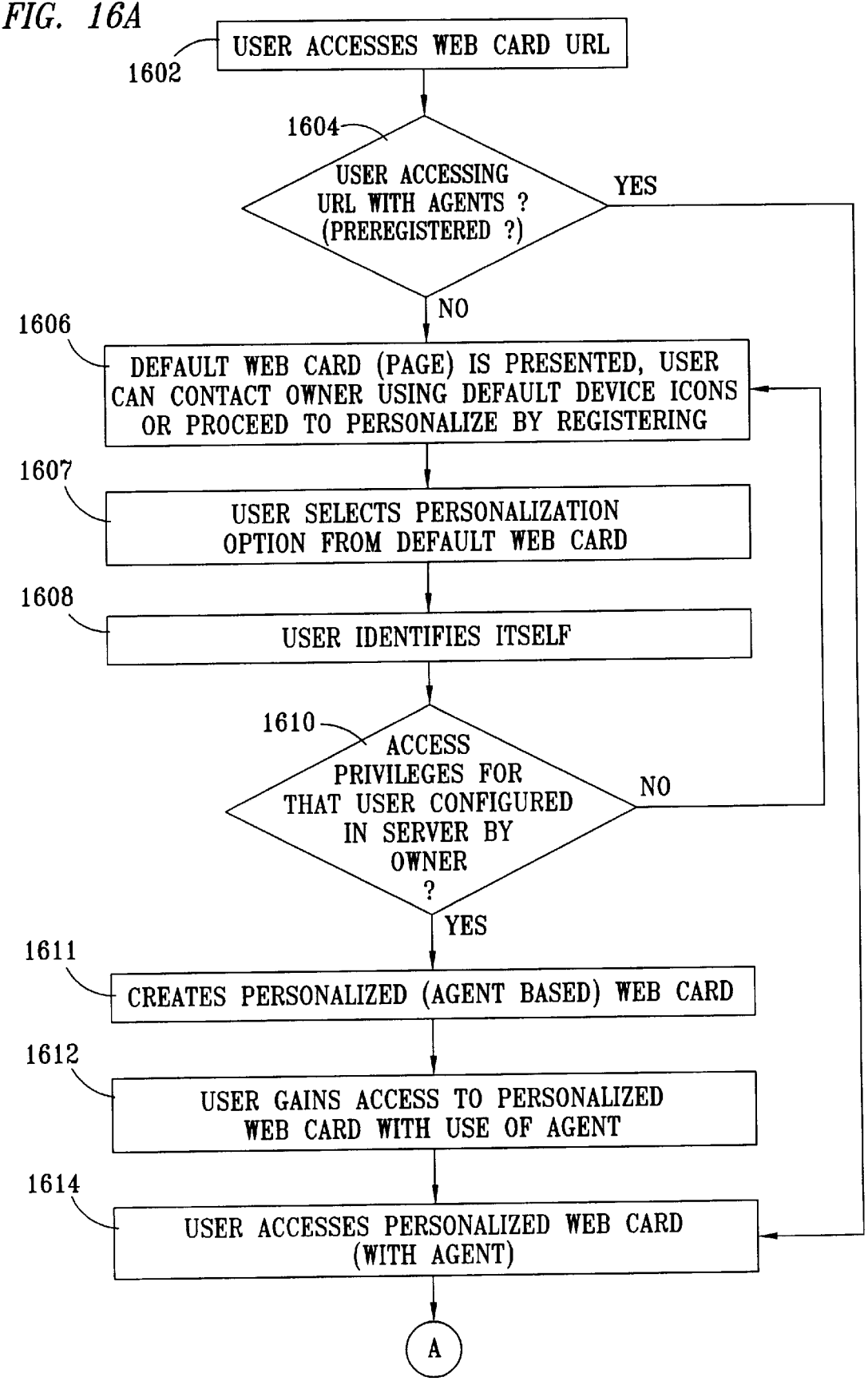
FIG. 16A illustrates, in flow diagram form, a methodology implemented to access a web card in a communications network.
Figure 16B:
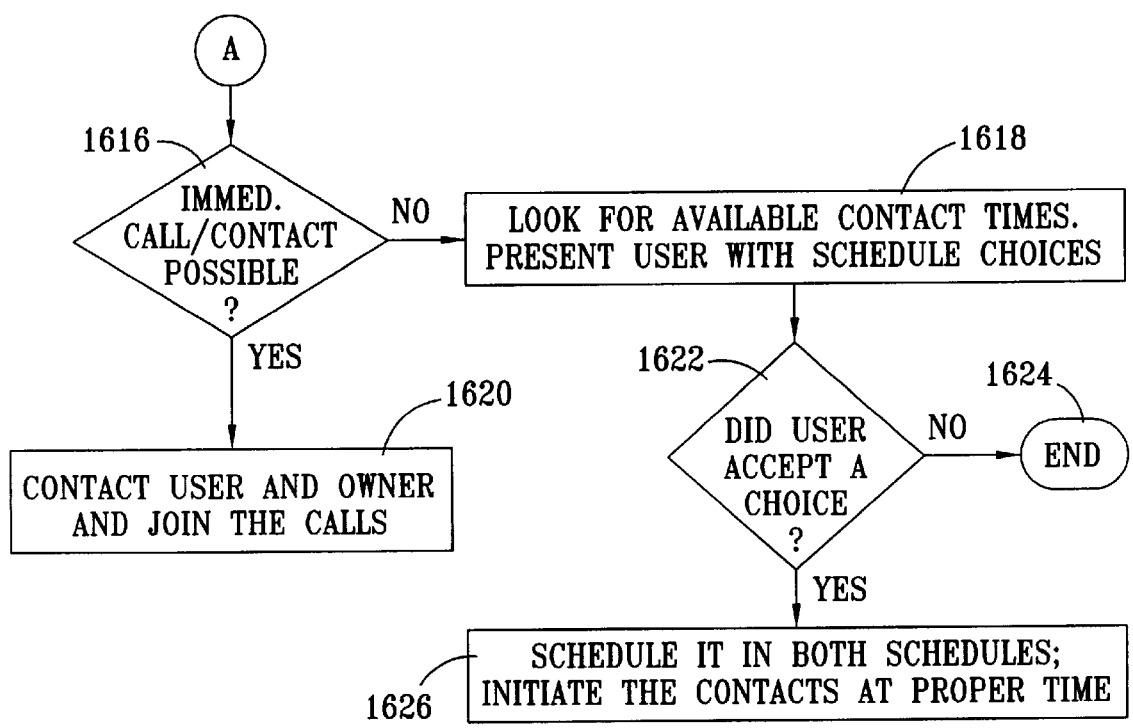
FIG. 16B illustrates, in flow diagram form, a remaining portion of the methodology illustrated in FIG. 16A.

Agent technology may also be used to negotiate and determine a relationship between the parties. Such agent technology will subsequently be described in greater detail. FIG. 16A illustrates steps executed by a user attempting to contact an owner's web card page associated with another. FIG. 16B illustrates a specific example utilizing the methodology of the present invention. In a first step 1602, the user may access a URL associated with the owner's web card page. In a step 1604, a determination is made as to whether the user is accessing the URL with pre-registered agents. It should be noted that an agent is a software program that performs remote programming functions. Furthermore, an agent of the user may be implemented using agent technology such as that disclosed in U.S. Pat. No. 5,603,031, by White, et al., and assigned to General Magic, Inc., which is hereby incorporated by reference herein. If the user is accessing the URL using agent technology, a program flow goes to step 1614, wherein the user accesses the personalized web card page with the agent.

However, if the user is not accessing the URL with agents, a step 1606 is executed. In step 1606, a default web page is presented to the user. The user may then select default communication devices through default device icons to be used to contact the owner. Alternatively, the user may then proceed to personalize the default web card page by registering certain icons. Subsequently, in a step 1607, the user selects a personalization option from the default web card page. In a step 1608, the user may be required to identify themselves. Once this information is received, a determination is made whether access privileges for that user have been configured in the web card database/server by the owner of the web card page. If not, a program flow returns to step 1606. If the access privileges have been configured in the web card database/server by the owner, a user may create a personalized, or agent-based web card page in a step 1611. The user may then gain access to the personalized web card page with the use of an agent in step 1612. Subsequently, in a step 1614, the user may access the personalized web card with the agent.

Next, in a step 1616, the web card database/server determines whether an immediate call or some other form of contact is possible between the user and the web card page owner. If yes, then the web card database/server implements the steps required to immediately contact both the user and the owner and to join the calls in the step 1620. Such contact and connection is described in greater detail in "Method and Apparatus for Originating Voice Calls," filed May 28, 1996, Ser. No. 08/652,659, which is hereby incorporated by reference herein.

If an immediate call or contact is not possible, then step 1618 is executed wherein the web card database/server determines whether there are any available contact times and presents the user accessing the web card pages with scheduled choices. In step 1622, web card database/server determines whether the user has accepted such choices. If not, the program flow terminates in a step 1624. If the user does accept a choice, then a call or communication indication is scheduled for both the owner of the web card page and the person accessing that web card page.

FIG. 17 provides a more general methodology implemented for linking a person or device that has accessed a web card page. In the first step 1702 of FIG. 17, it may be assumed that a user accesses a web card page and performs a transaction therein. Such a transaction may include accessing an icon through well-known techniques or the like. Subsequently, in a step 1704, a web card database/server (e.g., web card database/server 422) prompts the user to enter his URL for purposes of establishing an HTML link for future communication between the user and the web card page owner. Next, in step 1706, the web card database/server (422) may also track the Internet protocol (IP) address of the device accessing the web card page to establish a link to that IP address in a step 1706.

Furthermore, the owner of the web card page may choose to log communications made to his web card page. The methodology for implementing this log is illustrated in greater detail in FIG. 18.

As illustrated in step 1802 of FIG. 18, assume that a user accesses a web card page to perform a transaction such as selecting an icon. Web card database/server logs the identity of the user of the web card page by storing an IP address or a user name. Additionally, the web card database/server may log the devices (icons) selected in the web card page, the type of information communicated (via fax, SMS, and the like), the information actually sent, and the time the transaction occurred. Additionally, it should be understood that additional information may also be logged.

The owner of the web card page may then view the logged information through an option on his web card page. The information that was logged is downloaded from the web card database/server to the data processing system of the web card page owner, where it is sorted and viewed in a step 1806.

Figure 19A:
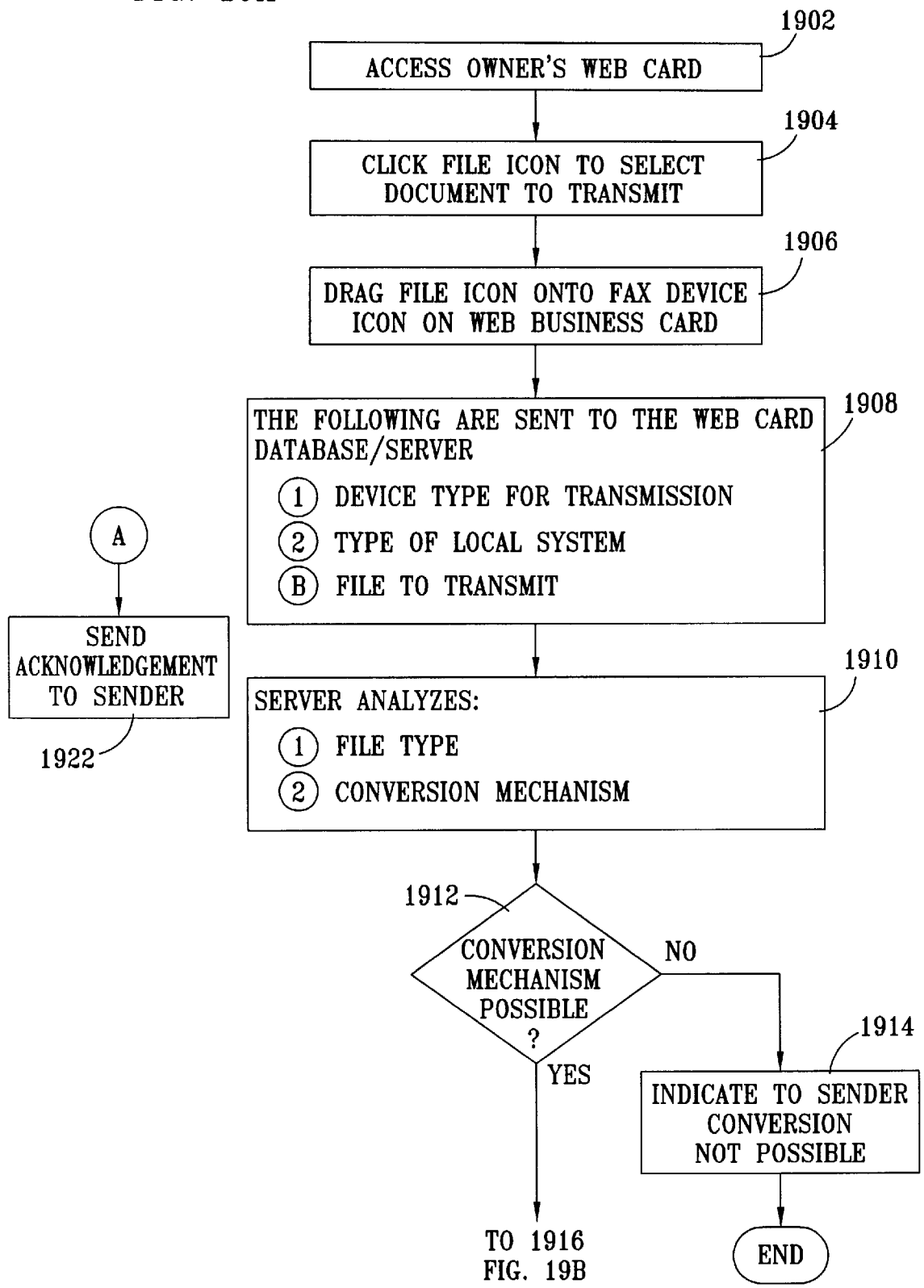
FIG. 19A illustrates, in flow diagram form, a methodology for accessing a user using a web card in accordance with one embodiment of the present invention.
Figure 19B:
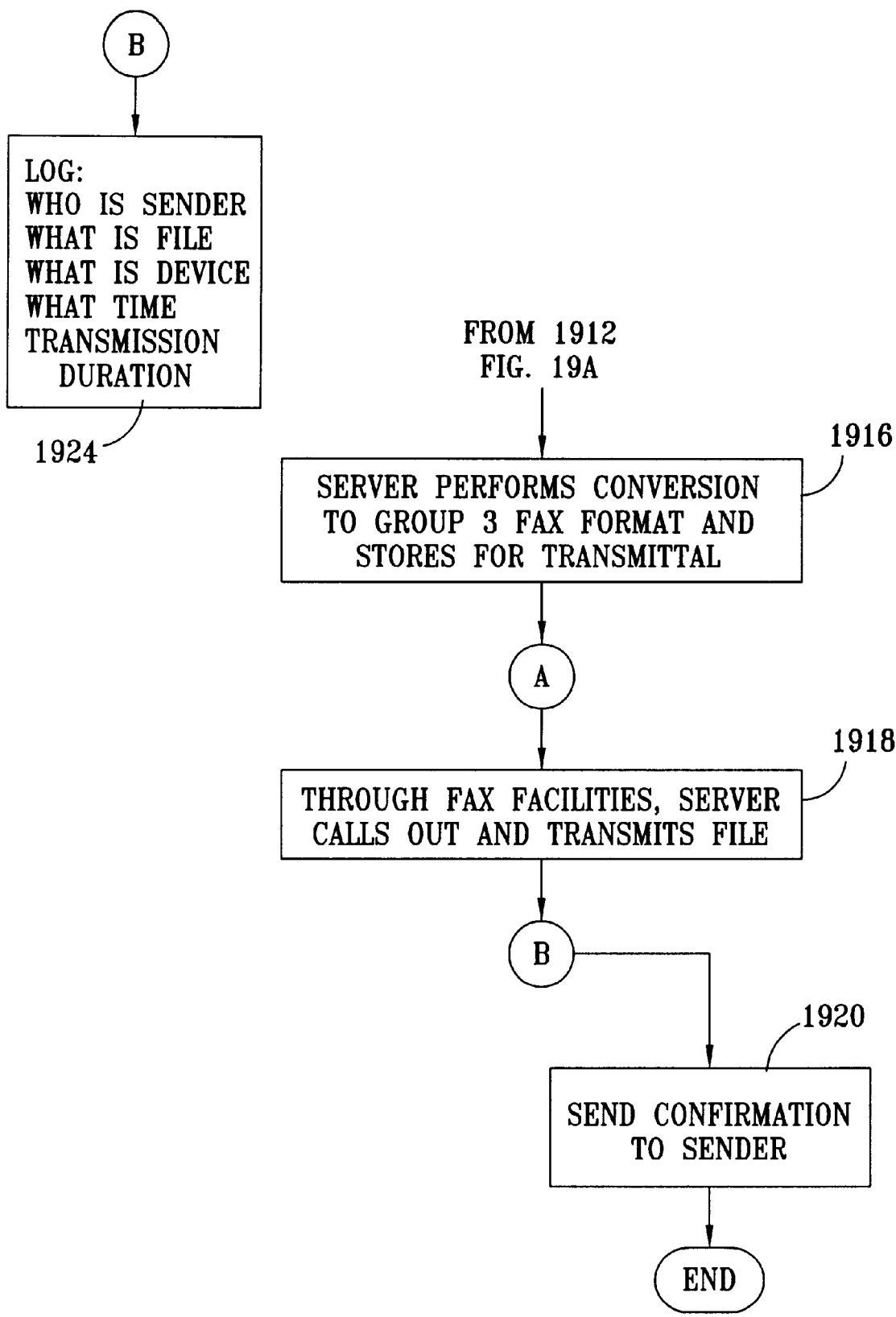
FIG. 19B illustrates, in flow diagram form, a remaining portion of the methodology of FIG. 19A.

FIGS. 19A and 19B illustrate a methodology implemented to convert files for transmission via the messaging system of the present invention. In a first step 1902, an owner's web card page is accessed using the previously outlined steps discussed herein. Subsequently, in a step 1904, the file icon is "clicked," or selected, to select a document to transmit. In one embodiment of the present invention, the file to be transmitted may be a word processing document created using a word processing application.

Next, in a step 1906, a file icon is "dragged" onto another device icon on the web card page using a well-known "drag-and-drop" fluction. The device icon may be assumed to be a facsimile device icon in one embodiment of the present invention. The data processing system from which the user accessed an owner's web card page transmits a device type for transmission, a type of local system, and a filed transmit to the Internet service provider in a step 1908. This information is subsequently transferred to the web card page database/server. Within the web card page database/server, the server analyzes the file type and a necessary conversion mechanism for converting the word document to an appropriate protocol for transmission to the desired device represented by the device icon. This analysis step is performed in step 1910. In step 1912, the server determines whether the conversion mechanism is possible. If not, in a step 1914, the server transfers a message via the communication network to the Internet service provider (412), and then to the user accessing the owner's web card page, to indicate that the conversion is not possible. A program flow subsequently terminates.

However, if the conversion mechanism is possible, a step 1916 is executed wherein the server converts the documents to the correct fax format and stores the converted form for subsequent transmittal. Next, in a step 1922, an acknowledgment is sent to the user to indicate that this conversion has occurred successfully. Such an acknowledgment is not a required step, but may be implemented in some embodiments of the present invention. Subsequently, in a step 1918, the web card page database/server retrieves and transmits the stored file through the appropriate fax facilities. As part of that procedure, a step 1924 may be executed to log the sender, the file, the device, the time, and a transmission duration, in one embodiment of the present invention. Subsequently, in a step 1920, a confirmation is sent to the user. A program flow subsequently terminates.

The aforementioned descriptions of data processing systems, communication networks, and methodologies for operating each implement a system that allows subscribers to have web card pages that are accessible by other individuals via communication networks such as the Internet. This web card page serves a similar purpose as paper business cards by providing references to available communication devices that may be used to access an individual. In addition to providing those references, the web card page performs an active feedback operation to indicate the availability of the communication devices. Additionally, the present invention implements the use of "hyper-icons" to indicate the status and roles of the owner of the web card page. Because such hyper-icons are utilized, a document or message to be sent may be "dragged-and-dropped" onto the hyper-icon for delivery. Through the use of the systems and methodologies disclosed herein, a communication network is implemented that effectively provides information, including accessibility, about a subscriber in a communication system in an efficient and effective manner.

It should be noted that the description provided herein is but one example of an implementation of the present invention. It should be noted that many additional implementations may also be utilized to realize the present invention. For example, it should be noted that the data processing system and methodology disclosed herein may be implemented in wireline, as well as, wireless networks. Additionally, within the wireless communication system, any number of protocols may be utilized to communicate, including but not limited to, ATM, GSM, CDMA, and the like.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A communication system, comprising:
   a web card database server for storing a plurality of access values, wherein each of the plurality of access values corresponds to one of a plurality of communication media of a first entity;
   a global communication network, comprising the Internet, that is capable of selectively communicating a first portion of the plurality of access values in response to a first control signal; wherein at least one of the first plurality of access values indicates a contemporaneous availability of the first portion of communication media; and
   a data processing system coupled to the communication network and to the web card database server for providing a second control signal, wherein the second control signal is a first uniform resource locator (URL) value, wherein the communication network is configured to communicate a first plurality of data values in response to receipt of the first uniform resource locator value, and wherein at least one of the plurality of data values indicates a contemporaneous availability of a corresponding one of the first portion of communication media.

2. The communication system of claim 1, wherein the data processing system further comprises:
   a display device for displaying a first web card page in response to the first plurality of data values, wherein the first web card page comprises a plurality of icons and each of the plurality of icons corresponds to one of a plurality of roles performed by the first entity.

3. The communication system of claim 2, wherein the data processing system provides the first control signal when a first one of the plurality of icons is accessed.

4. The communication system of claim 3, wherein the display device displays the first portion of the plurality of access values on the first web card page when the first one of the plurality of icons is accessed.

5. The communication system of claim 4, wherein each of the first portion of the plurality of data values indicates a characteristic for accessing a corresponding one of the plurality of communication media.

6. The communication system of claim 1, wherein the availability of the corresponding one of the first portion of communication media is automatically updated.

7. The communication system of claim 6, wherein the display device displays the corresponding one of the first portion of communication media in a first state when the corresponding one of the first portion of communication media is available and wherein the display device displays the corresponding one of the first portion of communication media in a second state when the corresponding one of the first portion of communication media is unavailable.

8. The communication system of claim 1, wherein the corresponding one of the first portion of communication media is capable of communicating with the first entity when available and is incapable of communicating with the first entity when unavailable.

9. The communication system of claim 4, wherein each of the first portion of the plurality of data values corresponds to a first one of the plurality of roles performed by the first entity.

10. A communication system comprising:
    a web card database server for storing a plurality of access values, wherein each of the plurality of access values corresponds to one of a plurality of communication media of a first entity;
    a global communication network, comprising the Internet, that is capable of selectively communicating a first portion of the plurality of access values in response to a first control signal;
    a data processing system, wherein the data processing system selectively provides a first uniform resource locator value and selectively provides a second uniform resource locator value; and
    wherein the communication network communicates a first plurality of data values in response to the first uniform resource locator value; wherein at least one of the first plurality of data values indicates a contemporaneous availability of a corresponding one of the first portion of communication media; wherein the communication network communicates a second plurality of data values in response to the second uniform resource locator value; and wherein at least one of the second plurality of data values indicates a contemporaneous availability of a corresponding one of the first portion of communication media.

11. The communication system of claim 10, further comprising:
    a display device for displaying a first icon corresponding to a first role of the first entity in response to the first plurality of data values and for displaying a second icon corresponding to a second role of the first entity in response to the second plurality of data values.

12. The communication system of claim 11, further comprising:
    interface means for allowing selection of one of the first icon and the second icon, the interface means generating a first plurality of information signals in response to selection of the first icon and generating a second plurality of information signals in response to selection of the second icon.

13. The communication system of claim 12, wherein the data processing system generates the first uniform resource locator in response to the first plurality of information signals and generates the second uniform resource location in response to the second plurality of information signals.

14. The communication system of claim 12, wherein the communication network communicates the first portion of the plurality of access values in response to the first uniform resource locator and communicates a second portion of the plurality of access values in response to the second uniform resource locator.

15. The communication system of claim 14, wherein the first plurality of access values is displayed on a display device in response to selection of the first icon and the second plurality of access values is displayed on the display device in response to selection of the second icon.

16. A communication system, comprising:
    a global communication network, comprising the Internet, for selectively providing a first control signal;
    a data processing system coupled to the network for displaying a plurality of icons, each of the plurality of icons corresponding to one of a plurality of roles of an entity, the data processing system generating a plurality of uniform resource locators, wherein each of the plurality of uniform resource locators corresponds to one of the plurality of roles of the entity, and the data processing system displaying a first plurality of information values corresponding to the entity in response to the first control signal, wherein at least one of the plurality of information values indicates a first plurality of codes corresponding to a first plurality of communication media by which the entity may be accessed, and wherein the first plurality of codes includes a code that indicates a contemporaneous availability of at least one of the first plurality of communication media; and a memory coupled to the data processing system for storing the first plurality of information values corresponding to the entity, wherein the memory provides the first plurality of information values in response to receipt of a first one of the plurality of uniform resource locators.

17. The communication system of claim 16, wherein the communication network is a global communication network.

18. The communication system of claim 16, wherein the first plurality of codes corresponds to a first one of the plurality of roles of the entity.

19. The communication system of claim 18, wherein a second plurality of information values indicate a second plurality of codes corresponding to a second plurality of communication media by which the entity may be accessed.

20. The communication system of claim 19, wherein the second plurality of codes corresponds to a second one of the plurality of roles of the entity.

21. A method for utilizing a web card page in a global communication network utilizing the Internet, the method comprising the steps of:

accessing the web card page in the global communication network;

placing a plurality of icons on the web card page, wherein each of the plurality of icons corresponds to one of a plurality of roles of an entity; and associating each of a plurality of sets of communication devices with each of the plurality of icons, wherein at least one of the icons is capable of indicating a contemporaneous availability of at least one of the communication devices, and further comprising the steps of:

accessing a first one of the plurality of icons; and retrieving a first one of the plurality of sets of communication devices associated with the first one of the plurality of icons.

22. The method of claim 21, further comprising the step of:

displaying the web card page and the plurality of icons on a display device.

23. The method of claim 22, further comprising the step of:

retrieving a first plurality of access values corresponding to the first one of the plurality of sets of communication devices.

24. The method of claim 21, further comprising the step of:

updating the plurality of sets of communication devices associated with each of the plurality of icons placed on the web card page.

25. The method of claim 24, further comprising the step of:

selectively modifying an appearance of each of the communication devices to indicate availability.

26. The method of claim 24, further comprising the step of:

notifying the entity when the plurality of sets of communication devices have been updated.

27. The method of claim 21, further comprising the step of:

updating the plurality of icons placed on the web card page; and updating the plurality of sets of communication devices associated with each of the plurality of icons placed on the web card page.

28. The method of claim 27, further comprising the step of:

selectively modifying an appearance of each of the plurality of icons to indicate availability.

29. A method for operating a global communication network utilizing the Internet, the method comprising the steps of:

accessing a web card page corresponding to an entity in the global communication network, wherein the web card page comprises a plurality of communication devices; and indicating a contemporaneous availability of each of the plurality of communication devices for use in communicating with the entity;

further comprising the steps of:

displaying a plurality of icons on a display device, wherein each of the plurality of communication devices corresponds to one of the plurality of icons;

displaying a first one of the plurality of icons in a first state to indicate a first one of the plurality of communication devices is available for use in communicating with the entity; and displaying the first one of the plurality of icons in a second state to indicate the first one of the plurality of communication devices is unavailable for use in communicating with the entity.

30. The method of claim 29, further comprising the steps of:

determining when the entity has disabled the first one of the plurality of communication devices; and displaying the first one of the plurality of icons in the second state.

31. The method of claim 29, further comprising the steps of:

detecting when the first one of the plurality of communication devices is inaccessible to the global communication network; and displaying the first one of the plurality of icons in the second state.

32. The method of claim 29, further comprising the steps of:

determining when the entity has enabled the first one of the plurality of communication devices; and displaying the first one of the plurality of icons in the first state.

33. The method of claim 29, wherein the first one of the plurality of communication devices is a wireless device.

34. The method of claim 33, further comprising the steps of:

retrieving a first message from a first mobile switching center indicating the wireless device is inaccessible by the global communication network; and selectively displaying a first icon corresponding to the wireless device in the second state.

35. The method of claim 34, further comprising the steps of:

comparing an identification number corresponding to the wireless device to a plurality of identification numbers stored in a memory; and performing a step of selectively displaying the first icon in the second state when the identification number corresponding to the wireless device corresponds to one of the plurality of identification numbers.

36. The method of claim 33, further comprising the steps of:

retrieving a message from a mobile switching center indicating the wireless device is accessible by the global communication network; and selectively displaying a first icon corresponding to the wireless device in the first state.

37. The method of claim 36, further comprising the steps of:

comparing an identification number corresponding to the wireless device to a plurality of identification numbers stored in a memory; and performing a step of selectively displaying the first icon in the first state when the identification number corresponding to the wireless device corresponds to one of the plurality of identification numbers.

38. The method of claim 29, further comprising the steps of:

accessing a first one of the communication devices which is unavailable for use in communicating with the entity;

sending a first plurality of data values to the first one of the communication devices; and storing the first plurality of data values in a memory.

39. The method of claim 38, further comprising the step of:

sending the first plurality of data values to the first one of the plurality of communication devices when the first one of the plurality of communication devices is available for use in communicating with the entity.

* * * * *